(12) United States Patent
Maritzen et al.

(10) Patent No.: US 7,729,925 B2
(45) Date of Patent: Jun. 1, 2010

(54) SYSTEM AND METHOD FOR FACILITATING REAL TIME TRANSACTIONS BETWEEN A USER AND MULTIPLE ENTITIES

(75) Inventors: L. Michael Maritzen, Fremont, CA (US); Harold Aaron Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1303 days.

(21) Appl. No.: 11/047,945

(22) Filed: Jan. 31, 2005

(65) Prior Publication Data
US 2005/0203765 A1 Sep. 15, 2005

Related U.S. Application Data

(63) Continuation of application No. 09/733,318, filed on Dec. 8, 2000, now abandoned.

(51) Int. Cl.
*G06Q 10/00* (2006.01)
*G06Q 30/00* (2006.01)
*G06Q 40/00* (2006.01)

(52) U.S. Cl. ............ 705/1.1; 705/26; 705/39
(58) Field of Classification Search .......... 705/1, 705/26, 39
See application file for complete search history.

(56) References Cited

U.S. PATENT DOCUMENTS

| | | | |
|---|---|---|---|
| 5,280,527 A | 1/1994 | Gullman et al. | |
| 5,329,589 A * | 7/1994 | Fraser et al. | 379/91.02 |
| 5,420,926 A | 5/1995 | Low et al. | |
| 5,426,281 A * | 6/1995 | Abecassis | 235/379 |
| 5,590,038 A | 12/1996 | Pitroda | |
| 5,809,212 A | 9/1998 | Shasha | |
| 5,815,665 A | 9/1998 | Teper et al. | |
| 5,878,139 A | 3/1999 | Rosen | |
| 5,878,235 A | 3/1999 | Porterfield et al. | |
| 5,883,810 A | 3/1999 | Franklin et al. | |
| 5,926,789 A | 7/1999 | Barbara et al. | |
| 5,926,798 A | 7/1999 | Carter | |
| 5,966,704 A | 10/1999 | Furegati et al. | |
| 6,006,200 A | 12/1999 | Boies et al. | |
| 6,029,141 A | 2/2000 | Bezos et al. | |
| 6,041,308 A * | 3/2000 | Walker et al. | 705/14 |
| 6,085,169 A | 7/2000 | Walker et al. | 705/26 |

(Continued)

FOREIGN PATENT DOCUMENTS

EP 0 917 119 A2 9/1998

(Continued)

OTHER PUBLICATIONS

Tryllian Mobile Agents: Going Beyond the Web, A Commercial White Paper, Version 1.0-May 18, 2000, p. 1-21.

(Continued)

*Primary Examiner*—Naresh Vig
(74) *Attorney, Agent, or Firm*—Blakely, Sokoloff, Taylor & Zafman LLP

(57) ABSTRACT

A system and method for facilitating real time transactions between a user and multiple entities are described. In the system, an exchange of information related to a transaction involving a user and multiple entities is facilitated.

45 Claims, 25 Drawing Sheets

U.S. PATENT DOCUMENTS

| | | |
|---|---|---|
| 6,085,178 A | 7/2000 | Bigus et al. |
| 6,088,731 A | 7/2000 | Kiraly et al. |
| 6,148,241 A | 11/2000 | Ludtke et al. |
| 6,167,517 A | 12/2000 | Gilchrist et al. |
| 6,192,354 B1 | 2/2001 | Bigus et al. |
| 6,240,396 B1 | 5/2001 | Walker et al. ............ 705/26 |
| 6,260,024 B1 * | 7/2001 | Shkedy ............ 705/37 |
| 6,263,317 B1 | 7/2001 | Sharp et al. |
| 6,269,348 B1 | 7/2001 | Pare, Jr. et al. |
| 6,270,011 B1 | 8/2001 | Gottfried |
| 6,282,552 B1 | 8/2001 | Thompson et al. |
| 6,311,214 B1 | 10/2001 | Rhoads |
| 6,356,905 B1 | 3/2002 | Gershman et al. |
| 6,453,301 B1 | 9/2002 | Niwa |
| 6,466,919 B1 * | 10/2002 | Walker et al. ............ 705/37 |
| 6,598,026 B1 * | 7/2003 | Ojha et al. ............ 705/26 |
| 6,609,113 B1 | 8/2003 | O'Leary et al. |
| 6,754,636 B1 * | 6/2004 | Walker et al. ............ 705/26 |
| 6,816,843 B1 | 11/2004 | Baughman |
| 2003/0195806 A1 | 10/2003 | Willman et al. |

FOREIGN PATENT DOCUMENTS

| | | |
|---|---|---|
| JP | 2000-276018 | 10/2000 |
| TW | 351799 | 2/1999 |
| WO | WO 98/47116 | 10/1998 |
| WO | WO 0122351 | 3/2001 |

OTHER PUBLICATIONS

Alan Neibauer, "Running Microsoft Outlook 98", Microsoft Press, p. 44-55 (Copyright 1988).

About Gossip, http://www.Tryllian.com including Quickstart Guide, Products and Downloads (6 pgs) (Copyright 1999-2000).

Alan Freedman, The Computer Desktop Encyclopedia ($2^{nd}$ Ed.), pp. 16, 86, 1029, The Computer Language Company Inc., Point Pleasant, PA (Copyright 1999).

Borland, John, "The lastest in anti-piracy efforts: keystroke recognition", Jun. 13, 2000, CNET News.com.

"Music to be protected by BioPassword", Jun. 15, 2000, Musicrypt.com.

* cited by examiner

A RETAIL SYSTEM MODIFIED TO
SUPPORT THE INTERACTION OF LEGACY POS TERMINAL WITH
THE DIGITAL WALLET SYSTEM

AN ALTERNATIVE EMBODIMENT OF THE RETAIL SYSTEM
MODIFIED TO SUPPORT THE INTERACTION OF LEGACY POS
TERMINALS WITH THE DIGITAL WALLET SYSTEM

DIGITAL WALLET AND PRIVACY CARD

DIAGRAM OF THE MAJOR COMPONENTS OF THE PERSONAL POS, SHOWING THE DATA/ADDRESS BUS INTERCONNECT

RETURN OF PRODUCT

SYSTEM AND METHOD FOR FACILITATING REAL TIME TRANSACTIONS BETWEEN A USER AND MULTIPLE ENTITIES

RELATED APPLICATION

This application is a continuation application of Ser. No. 09/733,318, filed Dec. 8, 2000 now abandoned.

BACKGROUND OF THE INVENTION

1. Field of the Invention

The present invention relates generally to electronic commerce transactions.

2. Art Background

Electronic commerce is achieving widespread use. Transactions are performed everyday over the Internet and through point of sale (POS) or bank systems. Such systems are designed to maintain the integrity of the user's credit card, debit card, and account number. However, no measures are taken to ensure the privacy of the user. As the vendor retains information regarding the identity of the user, the user is open to receipt of marketing materials that may result from the data mining of transactions performed on a particular network.

Several applications supporting transactions over networks like the Internet have been developed, especially directed to the user-to-vendor relationship and to the concept of agent-assisted pricing models. Presently, applications provide direct agent negotiations and direct agent pricing between user and merchant or vendor.

However, these applications are not equipped to handle multiple merchants or vendors and real time transactions involving brokering of products or services. The above-mentioned applications lack an intelligent and automatic agent technology, which can function on behalf of a merchant or vendor to execute a referral and/or brokering negotiations resulting in performance of the transaction. Also, these applications lack a secure merchant-to-merchant brokering model that allows for exchange of information without sacrificing the privacy of the user.

SUMMARY OF THE INVENTION

A system and method for facilitating real time transactions between a user and multiple entities are described. In the system, an exchange of information related to a transaction involving a user and multiple entities is facilitated.

BRIEF DESCRIPTION OF THE DRAWINGS

The objects, features and advantages of the present invention will be apparent from the following detailed description in which.

DETAILED DESCRIPTION

Figure 1:
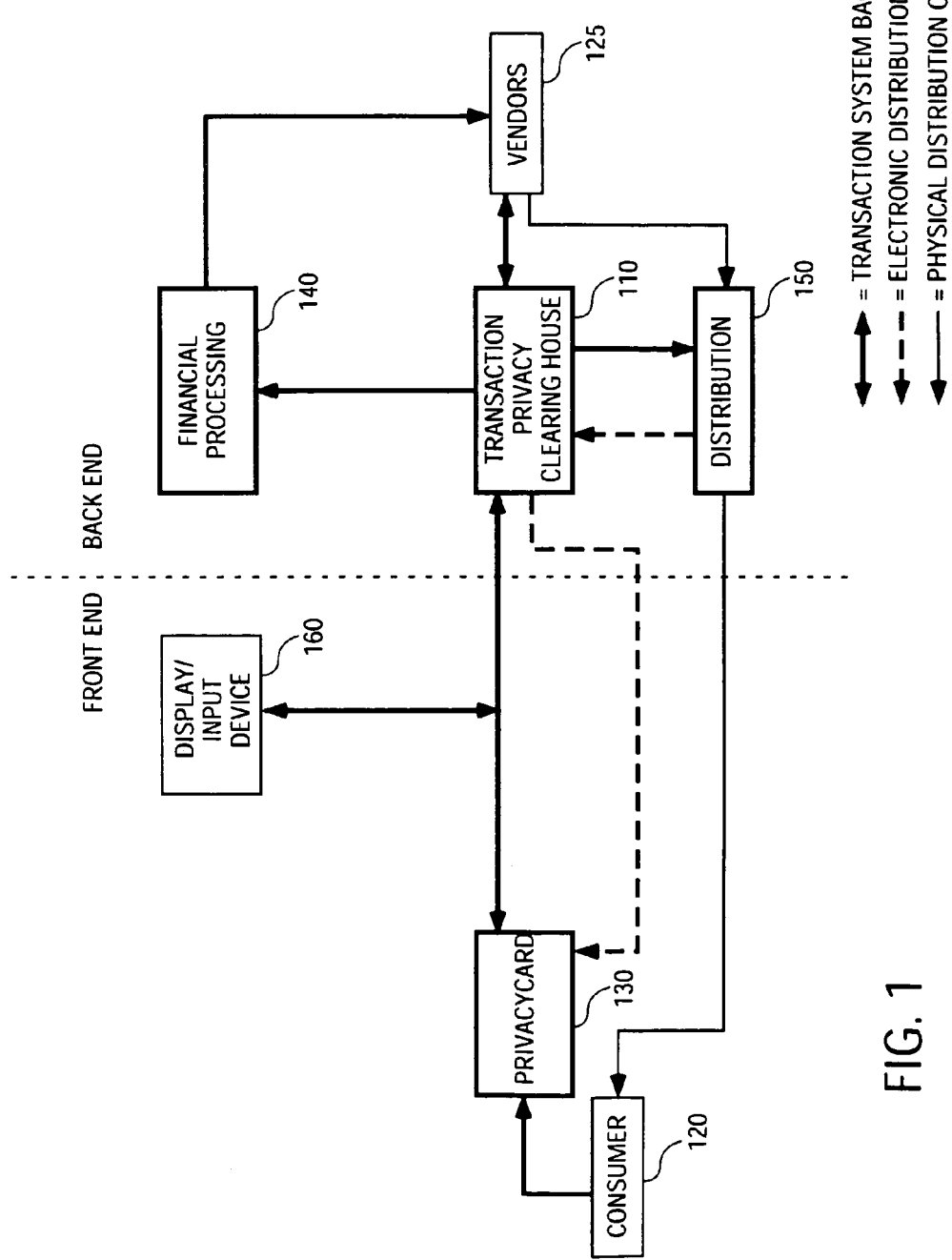
FIG. 1 is a simplified block diagram of an eCommerce system in accordance with one embodiment of the present invention.

In the following descriptions for the purposes of explanation, numerous details are set forth in order to provide a thorough understanding of the present invention. However, it will be apparent to one skilled in the art that these specific details are not required in order to practice the present invention. In other instances, well known electrical structures or circuits are shown in block diagram form in order not to obscure the present invention unnecessarily.

The system and method of the present invention enables a user to conduct electronic commerce transactions without compromising the user's personal identification information and identity, while also providing enhanced direct marketing for vendors. The following description discusses the invention in the context of Internet and point of sale (POS) networks. However, it is readily apparent that the invention is not limited to these particular networks, and are applicable to any network that is configured to perform a transaction.

In one embodiment of the system and method of the present invention provides a privacy feature in which no links or records are kept that relate items purchased with a specific user identity except in one highly secure location is provided. It is contemplated that the present invention is operable in a variety of types of eCommerce systems including those which do not provide a privacy feature as described herein.

Although data can be collected to examine purchase patterns, personal information is not connected to this data for use outside the eCommerce system. The user connects to and performs transactions with the eCommerce system through a transaction device which has a unique identifier (ID). In one embodiment, a privacy card is used. In an alternate embodiment a digital wallet is used. In an alternate embodiment, a privacy card in conjunction with a digital wallet is used. The transaction device, e.g., the privacy card, is the identity that may be known to a vendor. The highly secured location, accessible through or part of a transaction processing clearing house (TPCH), provides the transaction processing clearing house the information necessary to authorize a transaction. For example, the transaction processing clearing house may access relevant account information to authorize transactions. However, the identity of the user is not revealed externally so that confidentiality of the user's identity is maintained.

In addition, a wide variety of convenient features can be offered to a user. For example, the transaction device can be configured to function compatibly with existing point of sale terminals at retail locations and provide encoded account information compatible with existing systems, for example, magnetic stripe and bar codes. In one embodiment, the magnetic stripe generator on the transaction device can be programmed to represent any account. Additionally, the screen on the transaction device can be used to display bar codes that can be scanned by existing POS terminals. Thus there is a capability to access multiple accounts from a single card, thereby eliminating the need to carry many different credit cards, such as debit and loyalty cards, but still providing the opportunity to use different accounts based on the user's choice. Furthermore, the transaction device may include a bar code reading device integrated therein. This feature would allow the user to scan product packaging and add that item to a purchase or an electronic shopping list.

In addition, the physical paper trail can be eliminated both for transaction receipts at the stores as well as monthly bills and bill paying on accounts by storing such information and providing access to such information through the transaction device. The automation of transaction record keeping at home can be enhanced as the receipts, bills and bill paying can be maintained on the transaction device or a coupled personal computing device.

Pay per use coupons may also be easily and automatically accessed from a variety of resources stored in the card and automatically cashed in when purchases are made using the card. Electronic coupons (eCoupons) are another example of eliminating paper (i.e., eliminating paper coupons) by adding value in electronic form. Additional value comes in the form of wider methods of distribution enhancements to the user experience and/or a more efficient processing on the vendor's side. For example, while shopping, an eCoupon stored in the transaction device can be used to pinpoint exact items the user wishes to purchase. In addition, at checkout the coupons may be automatically credited without intervention by the user. Alternately, the user may manually convey eCoupons through bar codes or the like by manual selection of the coupons. This causes the bar codes to be presented on the display of the transaction device, which are then scanned by the POS terminal. Check out clerks and administrative personal do not have to manually handle eCoupons so processing is more accurate and efficient for both the retailer and vendor. Because they are digital in nature, eCoupons benefit from flexible distribution opportunities across all forms of media, including: Internet, digital TV/radio broadcast, and packaged recorded media such as audio/computer/DVD recorded on tape or disk and accessed later on playback. By utilizing electronic coupons, real-time tracking usage provides vendors information regarding advertising channels that are returning results as eCoupons typically contain data structures that enable tracking of this information.

In addition, in one embodiment, electronic catalogs can be downloaded to the transaction device and the user may reference products/services by direct access of the catalog downloaded to the transaction device. The catalogs may also contain electronic coupons which are automatically "clipped" and added to the user's device for subsequent use during an applicable transaction. Automated shopping lists can be added to simplify the user's shopping experience. In addition, a directory of where things are located in a particular store may be located on the device to simplify the customer's shopping for items in a particular store environment.

Security of the user's identity may be achieved in a variety of ways. In one embodiment, a single trusted location, for example the TPCH, contains user data. The user interfaces with the TPCH using the user's transaction device. The user therefore does not fill out online electronic eCommerce purchase forms at every product vendor's website. The eCommerce system acts as a financial transaction middleman, stripping off user identity information from transactions. As a result, the user's private information is not stored in several databases across the Internet and in private business networks (e.g. grocery store networks). The fewer locations where the data is stored, the fewer the possibilities that hackers can access the data or that accidental releases of the data occur.

The transaction device enhances security by authenticating the user of the card prior to usage such that if a card is lost or stolen, it is useless in the hands of an unauthorized person. One means of authentication is some kind of PIN code entry. Alternately, authentication may be achieved by using more sophisticated technologies such as a biometric solution (e.g., fingerprint recognition). In addition, in one embodiment in which multiple transaction devices, e.g., a privacy card and a digital wallet, are used, it may be desirable to configure the first device to enable and program the second device in a secure manner. Thus, the means of communication between the first device and the second device may include mutual device verification so that an unauthorized first device may not be used to enable a particular second device that does not belong to the same or authorized user.

In one embodiment, the transaction device(s), POS terminals and/or TPCH may function to verify the authenticity of each other. For example, a privacy card and digital wallet may be configured to verify the legitimacy of each other. Similarly, the transaction device may be configured to verify the legitimacy of the POS terminal and/or TPCH. A variety of verification techniques may be used. For example lists of devices with account and/or access issues may be maintained. For example, in one embodiment, the public key infrastructure (PKI) may be used to verify legitimacy.

Through the eCommerce system of the present invention, data mining and direct marketing services can also be offered to vendors. For example, any type of demographic questionnaire can be created by a vendor and distributed to users of this system while retaining their individual privacy. The data can be collected and returned to the vendor along with the means of identifying the specific target transaction devices that may subsequently receive the appropriate promotional materials. However, the identity of the user is not revealed. Thus, direct marketing is available to vendors even though user identity confidentiality is maintained. Additionally, the eCommerce system may automatically collect any type of data that can be obtained through use of this system and subsequently sold to third parties. However, individual privacy is always maintained.

In one embodiment, the transaction device may be configured to closely resemble a standard credit card. More particularly, the card may have a magnetic stripe or a smart card chip that functions similarly to standard credit cards. In addition, the transaction device may contain wireless data communication, data storage and communication protocols for selectively communicating with outside devices such as a digital wallet described herein, point of sale (POS) terminal or personal computer (PC) and digital televisions (DTV).

Communication protocols include those that allow the digital wallet to specify which of several possible data structures to use for a transaction and communication protocols that allow the digital wallet and other devices to securely share data with the transaction device. The transaction device may represent a single account such as a particular credit card, or it might represent multiple accounts such as a credit card, telephone card and debit card.

In one embodiment, the transaction device may include a full screen that covers one side of the card. Alternately, in one embodiment in which the transaction device is one embodiment of a privacy card, the privacy card may be coupled to a device, such as the digital wallet, described herein, that provides a display. In one embodiment the screen may be touch sensitive and therefore can be used for data input as well as output. In one embodiment, a user authentication mechanism such as a fingerprint recognition or other mechanism may be built directly into the card. Furthermore, the privacy card may have a wireless communication mechanism for input and output.

A variety of user interfaces may be used. In one embodiment, an input device may be incorporated on the transaction device. Alternately or supplementally an input device may be coupled to the transaction device. In one embodiment, an input device may be provided on a digital wallet coupled to a privacy card. User inputs may be provided on the POS terminals including a personal POS terminal.

In one embodiment, a tap-slide-tap user interface may be utilized. This uses a touch sensitive input mechanism, such as a touch sensitive screen. Alternately, a pen-based user interface such as Graffiti™, (Graffiti is a trademark of Palm Computing, Inc.) may be utilized. Alternately, a user slide, jog wheel or other pointing device on a touch screen may be used. The wheel may be used to cycle through candidate values of a particular data field. Data dials may also be used. The data dials are an abstraction for collection of data items through which the user cycles as the dial (spins). The data dials may be tailored to the data field for which they are being used. When a user taps on a field to activate data entry, the appropriate data dial is instantiated and linked to an on-screen slider. The slider enables the user to change a selected element.

As noted above, the transaction device acts as a user's worldwide proxy or alias. The transaction device contains a unique identifying value along with other information that allows the transaction privacy clearinghouse to track its use and assist in user transactions. The transaction devices themselves have an identity in the electronic commerce world; thus the cards are the entities with which outside parties communicate. For example, when a vendor wishes to send electronic coupons or other promotional material to a user who has been purchasing its products, the vendor specifies the transaction device identity as the target of distribution. The eCommerce system then uses various means of electronic distribution to ensure that this data is delivered to the transaction device. However, in some embodiments the user's true identity and direct contact information are not revealed.

One embodiment of a system is illustrated in FIG. 1. In this embodiment, a transaction privacy clearing house (TPCH) 110 interfaces a user 120 and a vendor 125. In this particular embodiment, a transaction device, e.g., a privacy card 130, is used to maintain the privacy of the user while enabling the user to perform transactions. The transaction device information is provided to the TPCH 110 that then indicates to the vendor 125 and the user 120 approval of the transaction to be performed.

In order to maintain confidentiality of the identity of the user, the transaction device information does not provide user identification information. Thus, the vendor or other entities do not have user information but rather transaction device information. The TPCH 110 maintains a secure database of transaction device information and user information. In one embodiment, the TPCH 110 interfaces to at least one financial processing system 140 to perform associated financial transactions, such as confirming sufficient funds to perform the transaction, and transfers to the vendor 125 the fees required to complete the transaction. In addition, the TPCH 110 may also provide information through a distribution system 150 that, in one embodiment, can provide a purchased product to the user 120, again without the vendor 125 knowing the identification of the user 120. In an alternate embodiment, the financial processing system need not be a separate entity but may be incorporated with other functionality. For example, in one embodiment, the financial processing system 140 may be combined with the TPCH 110 functionality.

In one embodiment, the financial processing system (FP) 140 performs tasks of transferring funds between the user's account and the vendor's account for each transaction. In one embodiment, the presence of the TPCH 110 means that no details of the transactions, other than the amount of the transactions and other basic information, are known to the FP 140. The TPCH 110 issues transaction authorizations to the FP 140 function on an anonymous basis on behalf of the user over a highly secure channel. The FP 140 does not need to have many electronic channels receiving requests for fund transfer, as in a traditional financial processing system. In one embodiment, a highly secure channel is set up between the TPCH 110 and the FP 140; thus, the FP 140 is less vulnerable to spoofing.

In one embodiment, the FP 140 is contacted by the TPCH requesting a generic credit approval of a particular account. Thus the FP 140 receives a minimal amount of information. In one embodiment, the transaction information, including the identification of goods being purchased with the credit need not be passed to the FP 140. The TPCH 110 can request the credit using a dummy charge ID that can be listed in the monthly credit statement sent to the user, so that the user can reconcile his credit statement. Further, the transaction device can include functionality to cause the credit statement to convert the dummy charge ID back to the transactional information so that the credit statement appears to be a conventional statement that lists the goods that were purchased and the associated amount charged.

A display input device 160 may be included to enable the user, or in some embodiments the vendor 125, to display status and provide input regarding the transaction device and the status of the transaction to be performed.

The system described herein also provides a distribution functionality 150 whereby products purchased via the system are distributed. In one embodiment, the distribution function 150 is integrated with the TPCH 110 functionality. In an alternate embodiment, the distribution function 150 may be handled by a third party. Utilizing either approach, the system ensures user privacy and data security. A variety of distribution systems are contemplated, for example, electronic distribution through a POS terminal coupled to the network, electronic distribution direct to one or more privacy cards and/or digital wallets, or physical product distribution.

If the product purchased is electronic in nature (e.g., software, content such as digital images, stock purchases, etc.) electronic distribution may be used. In one embodiment of electronic distribution, the TPCH 110 functions as the middleman of the distribution channel. This allows the TPCH 110 to retain user privacy by not exposing addressing information and possibly email addresses to third parties. In an embodiment which utilizes a POS terminal and a POS terminal is used for distribution, the content may be encrypted at the source and distributed via the system to the POS terminal wherein the POS terminal subsequently decrypts the distributed material. The POS terminal may then pass the data to an appropriate place desired by the user, for example, to a user controlled device such as PC storage, a digital wallet or a privacy card.

In one embodiment, the POS terminal may be a retail POS terminal. Alternately, the POS terminal may be a home-based personal POS terminal as described herein. Thus, a POS distribution channel may be configured to provide for secure transmission of large amounts of data. If small amounts of secured data or unsecured data are transmitted, the data may be directly transmitted to the transaction device, e.g., privacy card or digital wallet. In an alternative embodiment, the POS terminal functionality may be integrated into the transaction device eliminating the requirement of a coupling to a POS terminal. One use of the direct electronic distribution channel is for e-coupons and other promotional material distributed by vendors.

A physical distribution channel is used when the product purchased is physical (i.e., cannot be electronically transmitted to the user) in nature. Within the scope of physical distribution, two basic sub-categories will be discussed: products that are carried out by the user and products that are delivered from the vendor to the user via third party carrier. An example of a user distributed mechanism are actions such as carrying groceries out of a store. In these cases there is nothing for the system to handle regarding distribution and the electronic transaction mechanism described herein operates to ensure user privacy for the purchase.

However, when the product is to be delivered to the user, there should be a mechanism for retaining user privacy. In one embodiment, the eCommerce system provides a carrier with the necessary physical address information in a secure manner. In one embodiment, the system installs mechanisms at the point of packaging and distribution to ensure user privacy, while also ensuring that users receive what they pay for. Alternately, depending upon how distribution is handled, product packaging and addressing may occur at the vendor site and carriers may later pick a product up for delivery.

Figure 2:
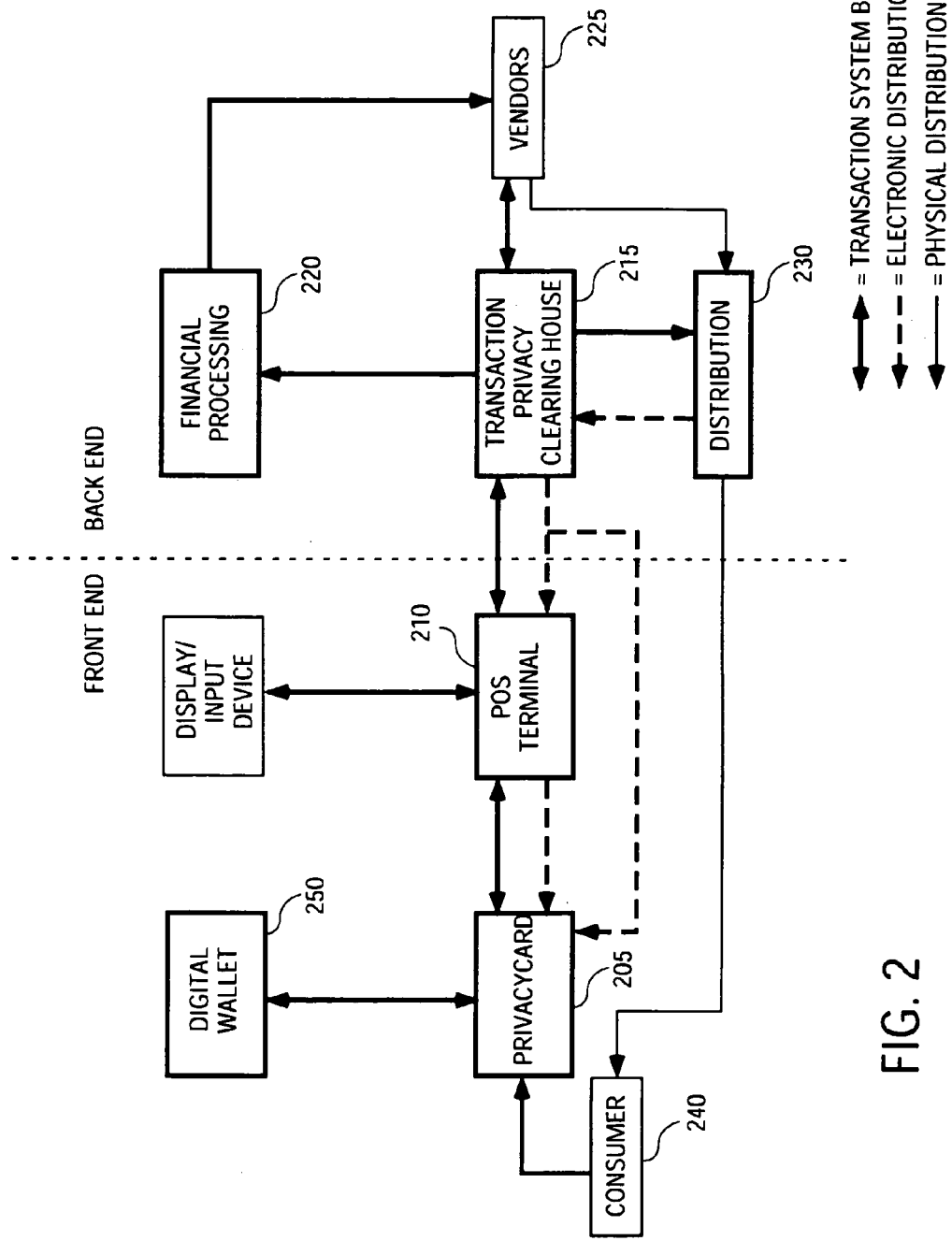
FIG. 2 is an embodiment of an eCommerce system, which utilizes a retail POS terminal.

One embodiment of a system that utilizes a point of sale (POS) terminal is shown in FIG. 2. In this embodiment, the privacy card 205 interfaces with the POS terminal 210 and the POS terminal 210 communicates with the TPCH 215. The TPCH 215 interfaces with the financial processing system 220, the vendor 225 and the distribution system 230. The POS terminal may be an existing (referred to herein as a legacy POS terminal) or a newly configured POS terminal located in a retail environment. The user 240 uses the privacy card 205 to interface to the POS terminal in a manner similar to how credit cards and debit cards interface with POS terminals. Alternately, a digital wallet 250 may be used by itself or with the privacy card 205 to interface to the POS terminal 210.

Figure 3:
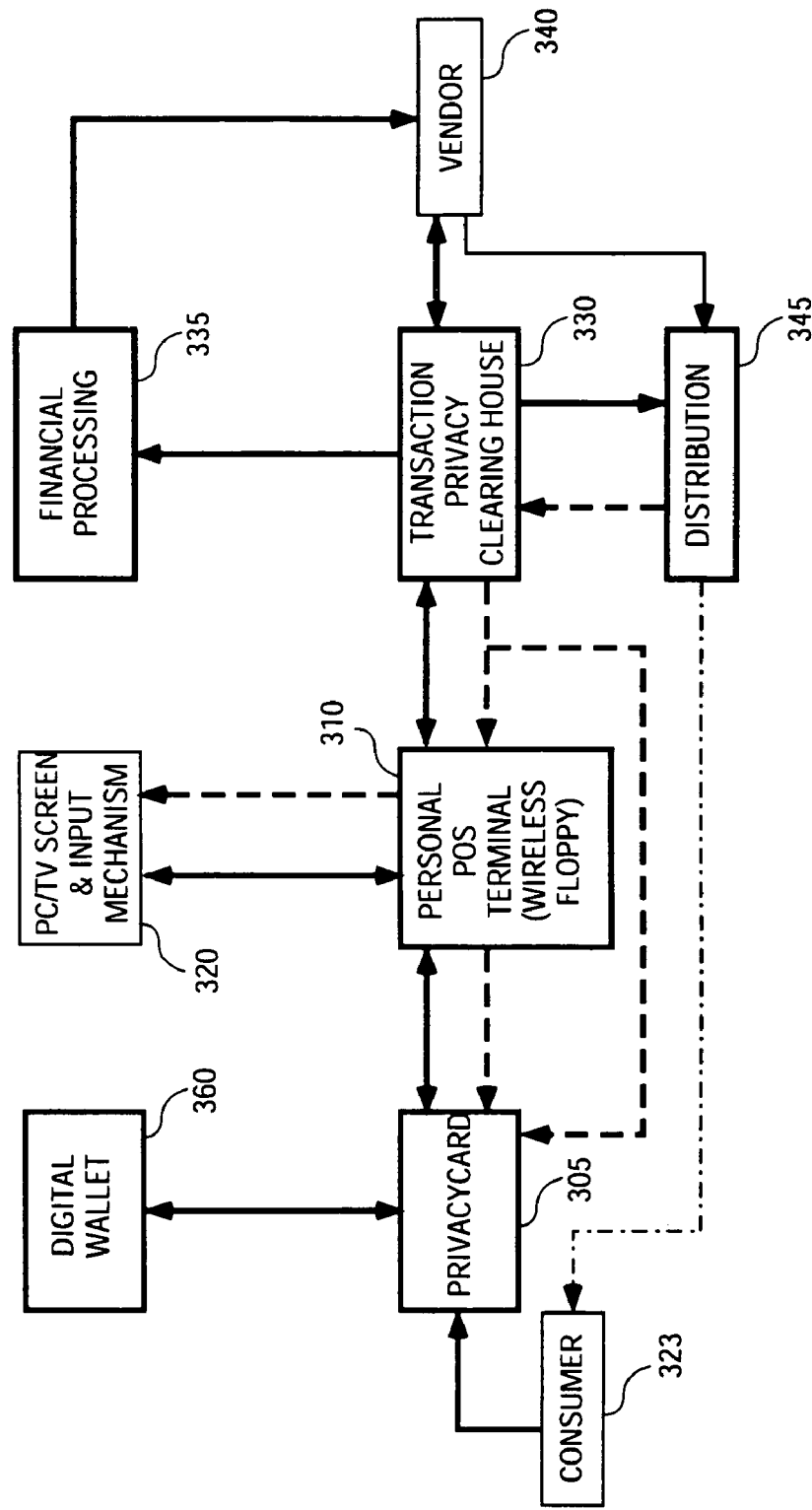
FIG. 3 is an embodiment of the in-home eCommerce system.

FIG. 3 illustrates an embodiment that may exist in home environments. In this embodiment, the privacy card 305 interfaces with a device 310 referred to herein as a personal POS terminal. The personal POS terminal interfaces with the system. The user may also have access using an input device such as a keyboard. An output device may also be provided, such as a computer display or a television monitor 320. Utilizing this embodiment, the user may perform transactions in-home through the TPCH 330. The TPCH 330 interfaces with financial processing system 335, vendors 340, and distribution systems 345 to authorize and perform the transaction. As noted above, in an alternate embodiment, a digital wallet may be used in conjunction with the privacy card to interface with the personal POS terminal 310.

Figure 4:
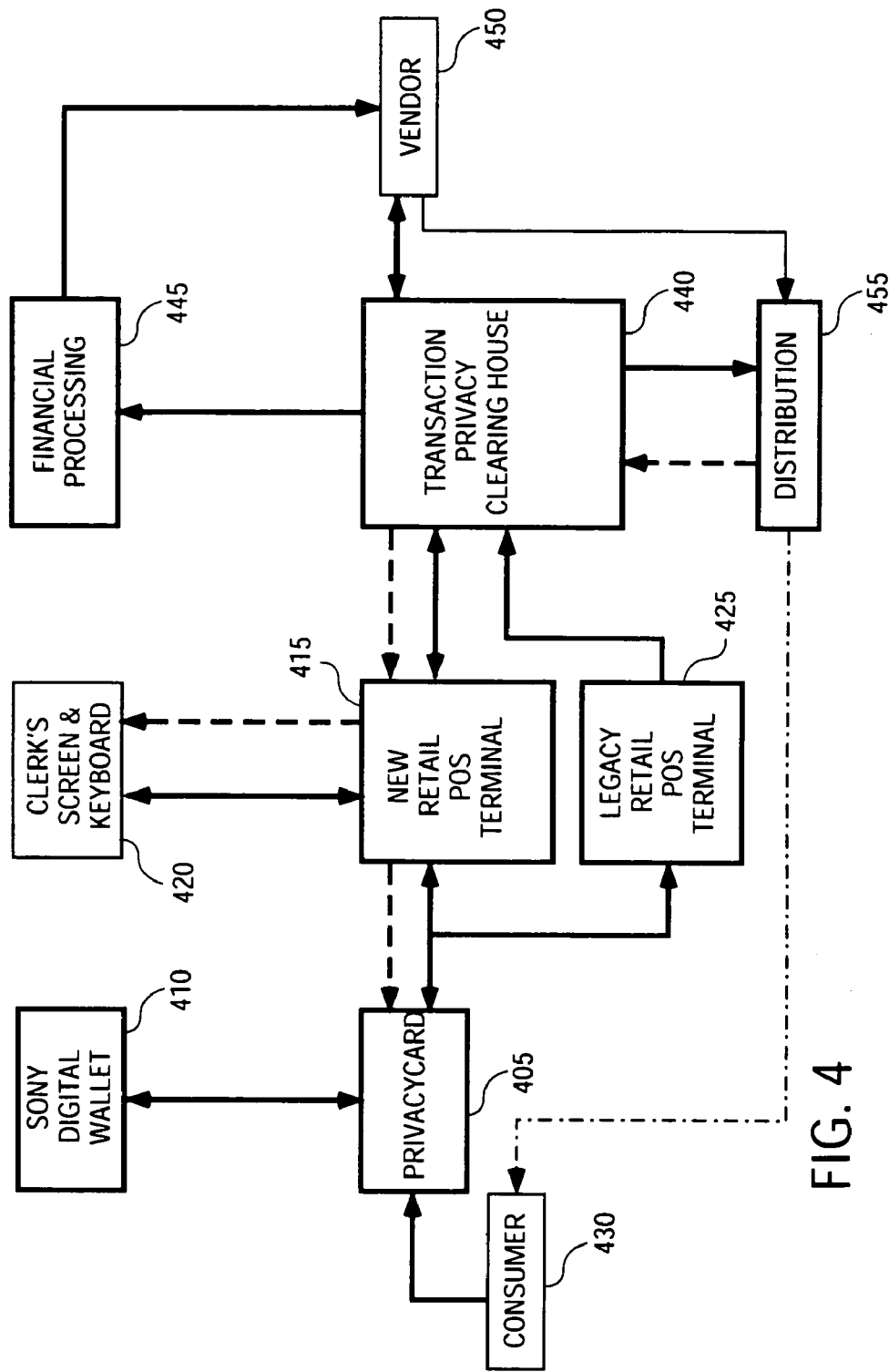
FIG. 4 is a block diagram of an embodiment of an in-store retail system.

An alternate embodiment contemplated for the retail environment is shown in FIG. 4. In this embodiment, the privacy card 405 interfaces with the digital wallet 410 and retail POS terminal 415. Alternately, the privacy card 405 interfaces directly to the retail POS terminal 415. The retail clerk may have a display and keyboard to perform input/output functions with respect to the POS terminal 415. The user 430 provides the transaction device, e.g., privacy card 405 and digital wallet 410, to the terminal 415. The terminal may be a terminal configured particularly to operate with a privacy card. Alternately, the transaction device may interface to a legacy retail POS terminal 425 wherein the privacy card 405 and/or digital wallet 410 provides a bar code or magnetic code readable by the legacy retail POS terminal 425.

Transaction privacy clearing house 440 receives the user's privacy card identification and determines whether the user has sufficient funds to perform the transaction. TPCH 440 interfaces with the financial processing system 445, vendors 450, and distribution systems 455 to complete the transaction.

Figure 5A:
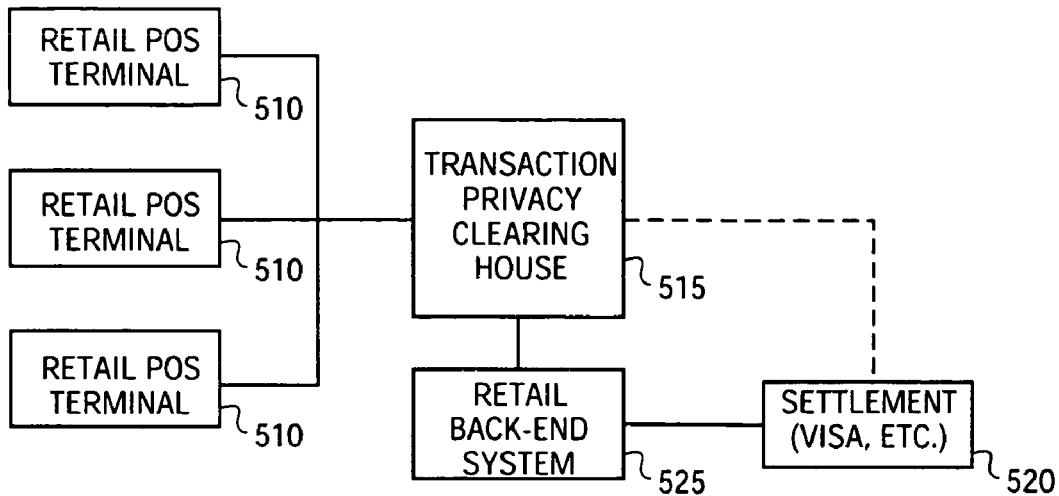
FIGS. 5a and 5b are simplified block diagrams illustrating embodiments of eCommerce systems that utilize POS terminals.
Figure 5B:
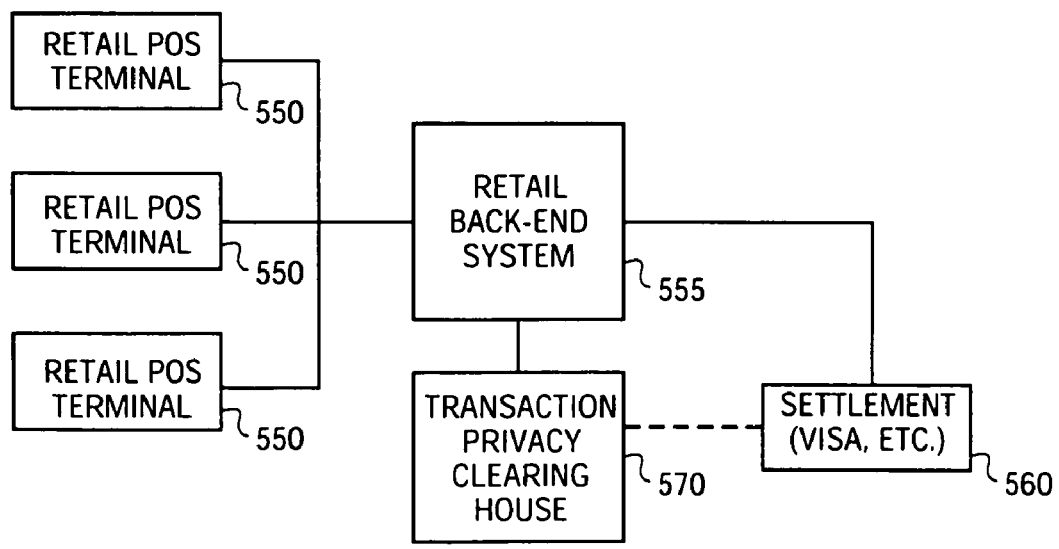

As noted above, it is contemplated that the transaction device would operate in a home environment as well as in a retail environment. FIG. 5a is a simplified block diagram of a retail system modified to support the interaction of a legacy POS terminal with a transaction device. The terminal 510 interfaces to TPCH 515 which communicates with the financial provider, for example, a credit card company 520, and the particular retailer 525. Alternately, as shown in FIG. 5b, the POS terminal 550 interfaces to the retail system 555, which then interfaces with the credit card company 560 and the TPCH 570.

It is contemplated that the transaction device will be compatible with a variety of eCommerce system's POS terminals and therefore will provide magnetic stripe, barcode information and/or smart card chip. The magnetic stripe on the card or digital wallet can be programmed to represent a new account; thus a single transaction device may be configured to represent a number of different accounts.

Figure 6:
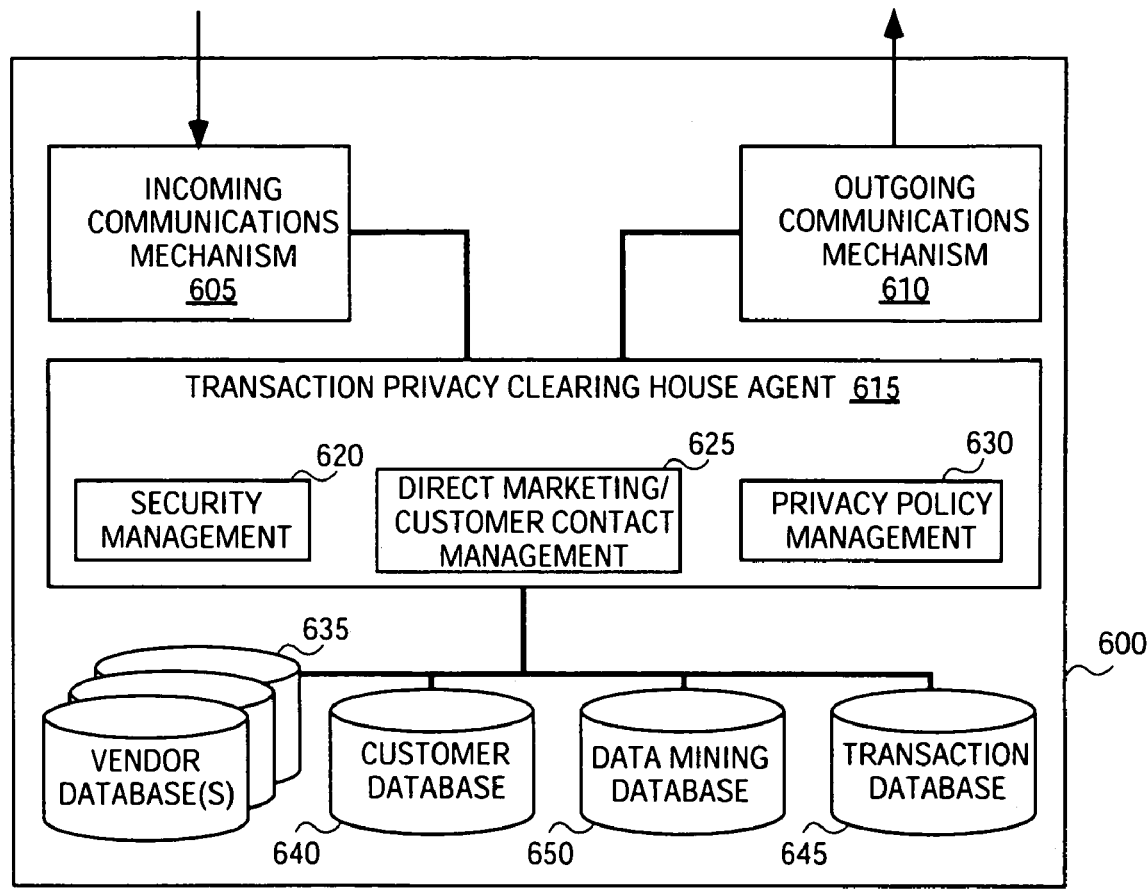
FIG. 6 is a simplified block diagram of a one embodiment of a transaction processing clearing house.

One embodiment of the TPCH is illustrated in FIG. 6. In one embodiment, the TPCH is located at a secure location and is accessible to the transaction device. The TPCH functions to provide the user with authorization to perform transactions without compromising the user's identity. The TPCH may be embodied as a secure server connected to the transaction device in some form of direct connection or alternately a form of indirect connection over the Internet or point of sales networks.

One embodiment of the TPCH 600 is illustrated by FIG. 6. The incoming communications mechanism 605 and outgoing communications mechanism 610 are the means of communicating with external retailers and vendors, as well as the transaction device such as the digital wallet. A variety of communication devices may be used, such as the Internet, direct dial-up modem connections, wireless or cellular signals, etc.

The TPCH agent 615 handles system management and policy control, and forms the core functionality of the TPCH 600. In one embodiment, within the entire system, there is one clearing house agent, which resides permanently at the clearing house. Among the responsibilities handled by the agent include internal system management functions such as data mining, financial settlement and allocation of payments to internal and external accounts, and registration of new users joining the system.

The security management function 620 ensures secure communications among the components internal to the TPCH 600 and the entities external to the TPCH 600. This function includes participating in secure communications protocols to open and maintain secure connections. This ensures that only authorized entities are allowed access to data and that only authorized transaction devices can execute transactions against a user's account.

The TPCH agent 615 also provides a direct marketing and customer contact service 625, which in one embodiment is a data access control mechanism that maintains separate, secure access between various clients and their database(s). The data access control mechanism ensures that vendors have access only to the appropriate data in order to carry out the tasks of the system. One of the key features of the TPCH, the ability to carry out focused direct marketing while maintaining the privacy and identity protection of the consumer, is handled by this mechanism.

The vendor databases 635 are a related to vendors and retailers that the TPCH is currently interacting with, or has previously interacted with. In one embodiment, there is a separate vendor database for each vendor, past and present. In an alternate embodiment, one database accumulates information about all vendors past and present.

In one embodiment, vendors use the database(s) to store a variety of information about the products and services that they offer through the TPCH and the transaction device. Some of the information in the database may be visible only to the vendor, such that even the TPCH may not be able to see all the entries.

The customer database 640 holds information regarding each customer of the TPCH. It is this database in which the only link between actual user identity information and the digital aliases provided by the transaction device exists.

The transaction database 645 is used by the TPCH to store records of all transactions facilitated by the TPCH. This database is used as a mirror backup for the transaction records that may exist in the transaction device.

In some systems, vendors have planned to use the Internet to send periodic financial records to their customers via email or other protocols. One of the problems with such a system is that the central data collection agency will ultimately be incurring potentially high transmission overhead by sending all of these transaction records to all users. Another problem is that users must wait for that periodic distribution to take place, and would normally be required to use means that are not truly convenient, such as email messages.

In one embodiment of the system of the present invention, the user collects a transaction record in the form of an electronic receipt immediately at the time of purchase, preferably by wireless communication between the POS terminal and the transaction device. The user then has the data readily available for use on demand, whether it is for a business expense report or for personal record keeping. However, if the transaction device is lost or stolen, all of that data is still replicated at the TPCH, for example, in the transaction database 645. Therefore, an exact duplicate of the device, including its transaction history, can be manufactured and sent to the customer, thereby minimizing the inconvenience of a lost or stolen device.

In one embodiment, the TPCH allows users to backup data that is generated directly on the transaction device, such as a telephone book and appointment information, into a storage location managed by the TPCH. In one embodiment, this backup action would happen automatically whenever the transaction device is coupled to the communication channel of the TPCH, for example, through a POS terminal. This would also facilitate the quick replacement of a lost or stolen transaction device along with all of its associated data, thereby further increasing the convenience of the user.

The data mining database 650 stores data mining rules and results. The rules can be in the form of scripts or query specifications, each of which has a label and other attribute information. One example of a rule may be "find all transaction device ID values that purchased product X in the recent week". These rules can be presented in an administrative application for human use, or triggered automatically by scheduled actions managed by the TPCH agent 615.

The transaction device is a physical device, such as a card, containing an identification that maintains the confidentiality of the user's identity by employing the transaction device ID as the identity of the entity performing the transaction. Thus, all transactions, from the vendor's perspective, are performed with the transaction device. One embodiment may be visualized in a form similar to Sony Corporation's Japan) FeliCa Card. The FeliCa is a contactless (wireless) card execution platform. The privacy card, in one embodiment, may have a form similar to the FeliCa but would operate in accordance with the teachings set forth herein.

As described herein, the TPCH maintains secure information linking a user to a particular transaction card identification and interfaces among the transaction device, vendor and any financial systems to provide the user authorization to perform and complete a transaction.

In one embodiment in which the transaction device is a privacy card, the privacy card provides a basic functionality to perform eCommerce transactions as described herein. The privacy card may include one or more of the following features: wireless/non-contact communication technologies such as that found in the Sony FeliCa card; magnetic stripe emulation/simulation technology; smart card contact interface; and secure transaction capability to verify that the partner device, e.g., card reader, is legitimate.

The above technologies, in one embodiment, may be implemented in such a manner as to not require on-card battery power. Power may be provided by a local RF energy field provided by an external device such as a non-contact card reader, which is picked up by a loop antenna in the card and converted into energy to power the on-card circuitry. Alternately, the power may be provided by the smart card chip interface. In another embodiment, the power may be induced by an RF field and stored in an RC (resistance/capacitance) circuit that slowly releases power as it is consumed by on-card circuitry. This would be analogous to a "temporary battery" that lasts on the order of a few seconds of operation. Once this RC storage is depleted, it must be recharged by an RF field before the card device can become activated again.

In an alternate embodiment, the privacy card may further include on-card fingerprint recognition, on-card display technology, which may be enabled via thin LCD technologies, touch/pen/button input, and software agent technologies.

These technologies, as a practical matter, may be operable with an on-card power supply so as to avoid having to be near an RF field in order enable the display and fingerprint functions and provide an on-demand functionality. One power source may be a lithium polymer battery which does not require the battery to be encased in a hard-shelled package and can be packaged into very thin formats. Thus one section of the card can be devoted to storing a lithium polymer power supply that can recharged by electrical induction.

In one embodiment, the privacy card is the size of a credit card. In one embodiment, to minimize the amount of circuitry and therefore the size of the card, a display is not provided. In addition, it is contemplated that network communication capabilities are not included on the privacy card. In such embodiments where desirable functionality is not included on the privacy card, a digital wallet, as described below, is provided to interface between the privacy card and the eCommerce network. The digital wallet, in an alternate embodiment, may be configured to function by itself. Alternately, such functionality is provided on the privacy card itself such that a device such as a digital wallet is not needed.

Figure 7A:
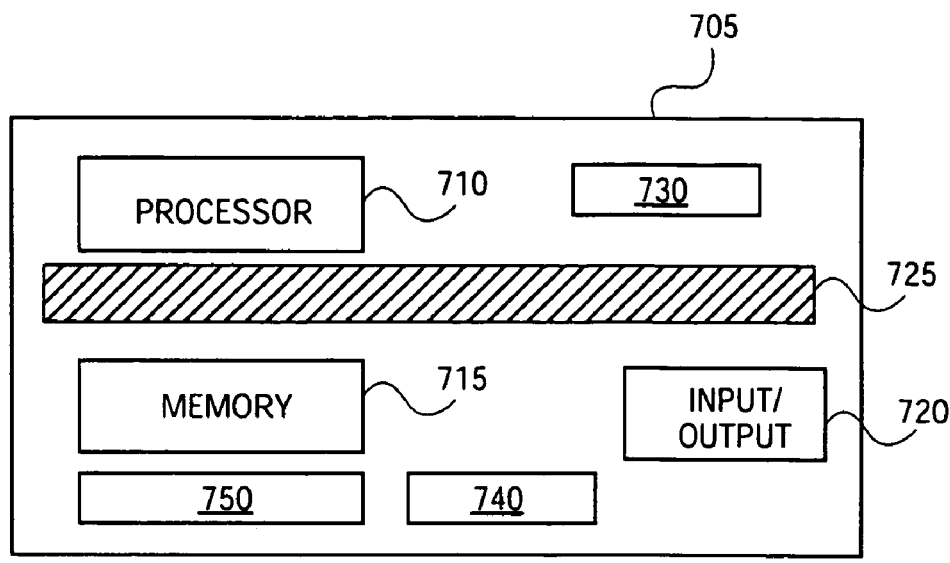
FIGS. 7a, 7b, 7c are simplified block diagrams of embodiments of a privacy card.

One embodiment of the privacy card is illustrated in FIG. 7a. As noted earlier, the privacy card 705 is configured to be sized for easy carrying and use. Thus, in one embodiment, the card 705 is configured to be the size of a credit card. The privacy card includes a processor 710, memory 715 and input/output logic 720. The processor 710 is configured to execute instructions to perform the functionality herein. The instructions may be stored in the memory 715. The memory is also configured to store data, such as transaction data and the like. In one embodiment, the memory 715 stores the transaction ID used to perform transactions in accordance with the teachings of the present invention. Alternately, the processor may be replaced with specially configured logic to perform the functions described here.

The input/output logic 720 is configured to enable the privacy card to send and receive information. In one embodiment, the input/output logic 720 is configured to communicate through a wired or contact connection. In another embodiment, the logic 720 is configured to communicate through a wireless or contactless connection. A variety of communication technologies may be used.

In one embodiment, a display 725 is used to generate bar codes scannable by coupled devices and used to perform processes as described herein. The privacy card 705 may also include a magnetic stripe generator 740 to simulate a magnetic stripe readable by devices such as legacy POS terminals.

In one embodiment, fingerprint recognition is used as a security mechanism that limits access to the card 705 to authorized users. A fingerprint touch pad and associated logic 730 is therefore included in one embodiment to perform these functions. Alternately, security may be achieved using a smart card chip interface 750, which uses known smart card technology to perform the function.

In another embodiment the privacy card may originate as a dumb device that includes minimal capabilities, referred to herein as an "open mode card". The open mode card may be configured to have a foundation of a secure access capability built in. Examples of open mode cards may be pre-paid phone cards or the like. However, in their original state (their state when obtained by the user), it is not secure and therefore can be used by anybody as is typical for dumb devices.

In one embodiment, the user purchases an open mode pre-paid phone card off the rack at a retail outlet, uses the card in open mode until the pre-paid value expires, then disposes of the card. In one embodiment, these cards have a business value because they can carry on-card images/text that act as free advertising for related services. If the user chooses to "upgrade", then the card can be converted to a secure device. However, if the user chooses not to upgrade, the same card still has a functional business and user value.

In an alternate embodiment, the open mode card may be converted to a secure card. In one embodiment the user converts the card to a secure mode device by inserting it into the digital wallet and performing a conversion/setup procedure. The main value is that the user's financial or other personal investment in the card now becomes more secure in the event of a lost or stolen card. Once converted, the card may not be used in open mode and is thus dedicated to the person who made the conversion. Additional capabilities of the card might be added or eliminated after conversion to secure mode, such as the ability for the card to be re-charged with a stored value.

Alternately, the card may be configured to operate in a dual mode wherein certain functionality may be accessed by anyone, and additional functionality that may only be accessed by specified users.

Alternately, a multi-mode may be established wherein use of the card is restricted to a specific set of people, or a specific set of functionality, or a specific set of host devices (digital wallets). For example, this may be a family card that allows the parents to spend up to the credit limit, and the children to spend up to a limit set by the parents, and only for certain types of purchases or stores.

Figure 7B:
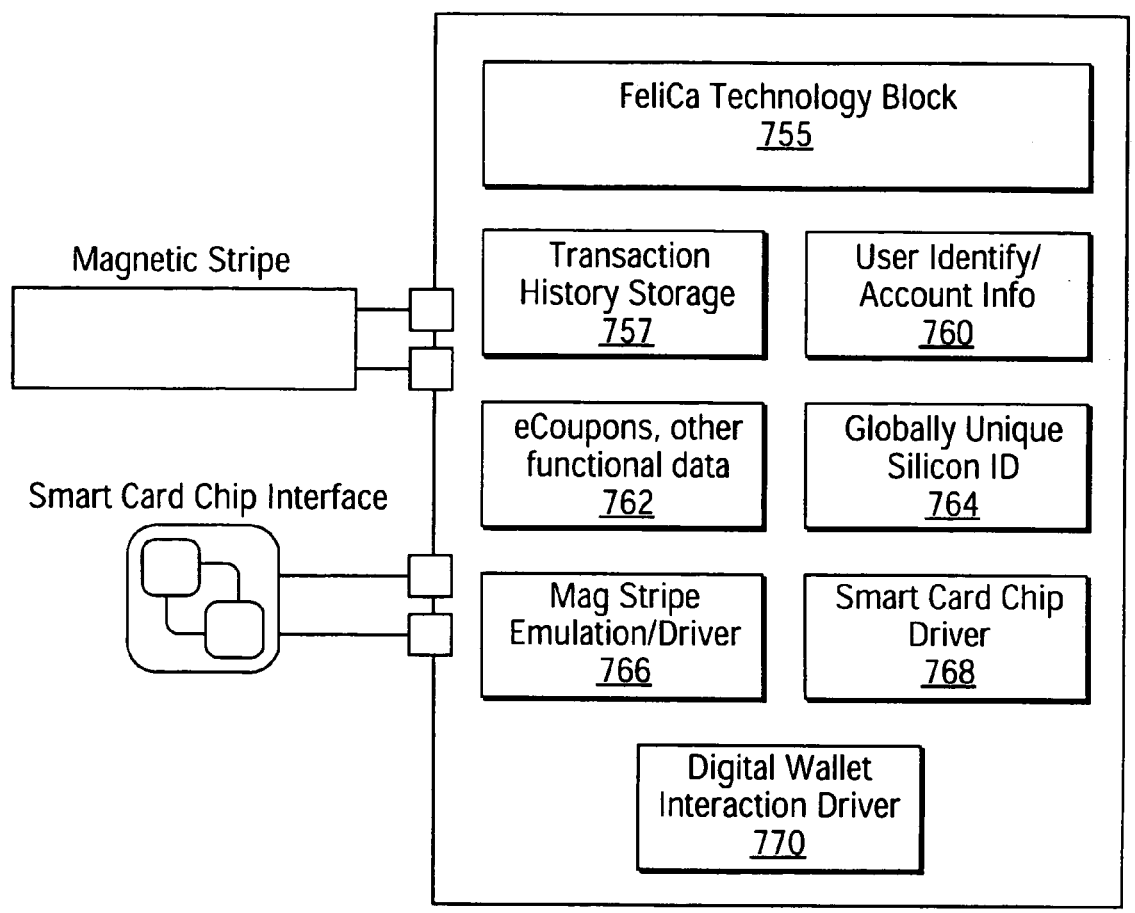

An alternate embodiment of the privacy card 750 is illustrated in FIG. 7b. In this embodiment, technology found in existing FeliCa cards is incorporated, represented by block 755. This technology may include power using received RF signals picked up by a loop antenna. Alternately, the card 750 may include a battery (not shown).

The transaction history storage area 757 stores transaction records (electronic receipts) that are received from POS terminals. The ways for the data to be input to the card include wireless communications and the smart card chip interface which functions similar to existing smart card interfaces. Both of these approaches presume that the POS terminal is equipped with the corresponding interface and can therefore transmit the data to the card.

The magnetic stripe 759, in one embodiment, may be designed as a two-way data interchange interface, allowing a POS terminal to write data onto the magnetic stripe, which is then captured by logic in the card and stored in the transaction history area 757. However, it requires the POS terminal to have such capability and further requires a different mode of user interaction—holding the card stationary at the POS terminal instead of swiping the card through a slot.

The user identity/account information block 760 stores data about the user and accounts that are accessed by the card. Typically, in one embodiment, this data may only be changed by authorized devices such as an authorized digital wallet or TPCH. The type of data stored includes the meta account information used to identify the account to be used.

The eCoupons and other financial data storage block 762 is used for storing data that is to be used during financial transactions, such as eCoupons that are to be transmitted to the POS as part of the purchase activity. An example of other financial data might include account balances that are dynamically updated as transactions are performed.

The globally unique silicon ID (GUID) 764 is used to identify the privacy card among other existing transaction cards. There are several ways known in the art of assigning and tracking these values to ensure that they are unique across manufacturers and product lines.

The mag stripe emulation/driver block 766 dynamically generates a magnetic stripe data image for use in some POS terminals, such as legacy POS terminals. In one embodiment, the decision of what data to simulate on the magnetic stripe is made by the user when the privacy card is activated, for example when coupled to a digital wallet. The user is provided with a menu of accounts that can be used, and selects one of them. The digital wallet indicates which account was selected and the driver 766 programs the stripe accordingly.

The smart card chip driver 768 performs a similar function as the mag stripe driver 766 except that it uses the industry standard chip interface. This interface defines a simple serial data transmission between the card and the reader/writer device (e.g., POS terminal) and is known in the art. This is advantageous to enable the privacy card to be useful with devices, e.g., POS terminals, that have a smart card chip interface.

The digital wallet interaction driver block 770 manages the interaction of the privacy card with a digital wallet device. When the car is inserted into the digital wallet, this block initiates the card-side security algorithms of digital wallet validation. As the user interacts with the wallet's touch screen, the wallet will request data from and store data to the card, which may also be handled by block 770. When the privacy card is removed from the wallet, the functional block takes care of all necessary security measures to protect the data and functionality of the card. Thus, for example, if the privacy card was inserted and activated, causing the magnetic stripe to be dynamically programmed with an account alias value and the card was then removed from the digital wallet to be swiped through a legacy POS terminal, then block 770 would initiate a timer, for example for 20 seconds. Once the timer expires, the block 770 would disable the magnetic strip emulator, effectively deleting the account alias from the magnetic stripe.

Figure 7C:
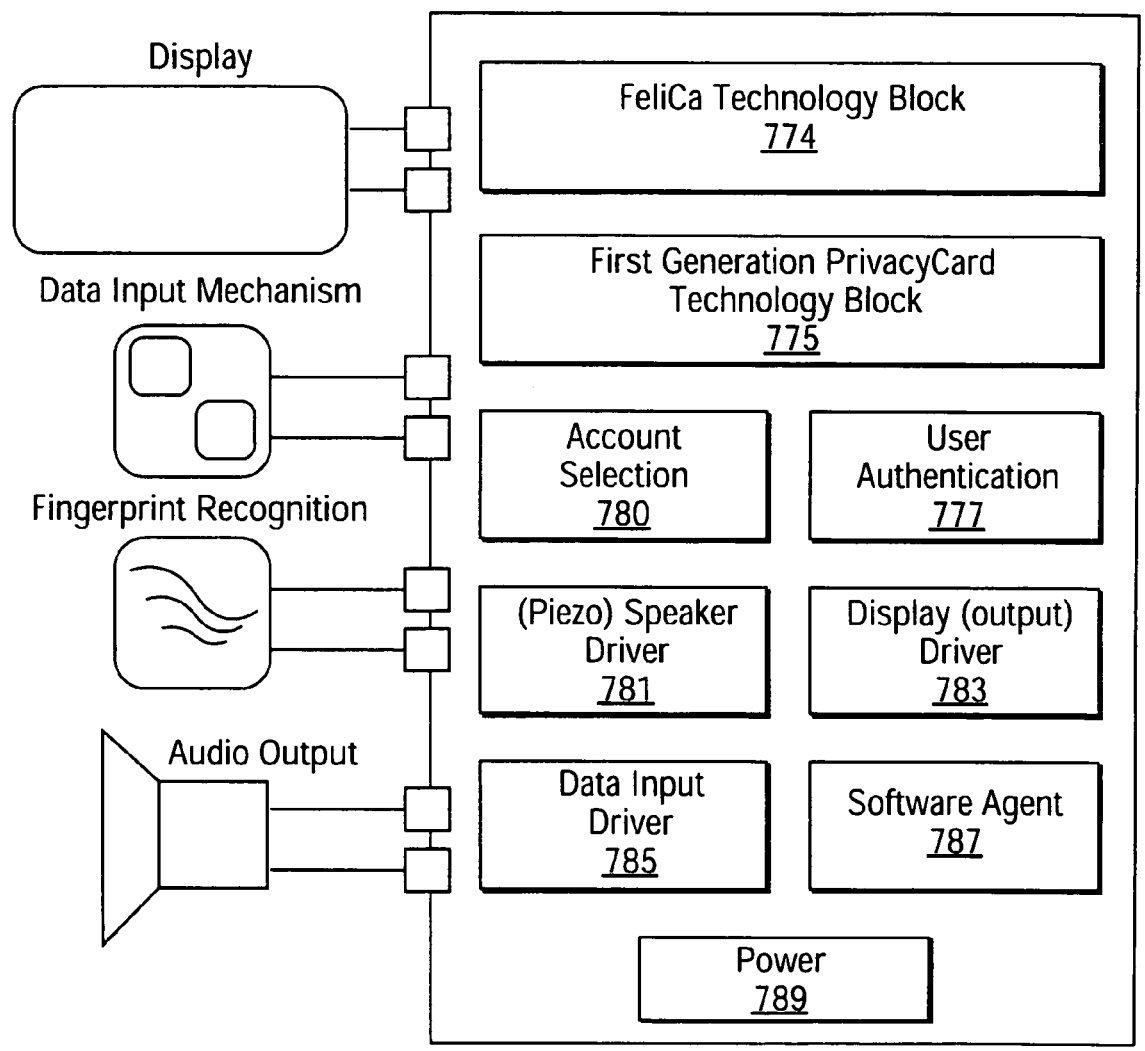

An alternate embodiment is shown in FIG. 7c. In this embodiment, the privacy card may include those functions set forth in FIG. 7b, referred to herein as first generation privacy card technology block 775 and FeliCa Technology block 774, and further include the functions represented by blocks 777, 780, 781, 783, 785, 787, 789.

The user identity info block 760, which was described previously in FIG. 7b PrivacyCard, may contain the authorized fingerprint recognition samples. In one embodiment, those samples are entered into the device during its initialization phases, which have been described elsewhere.

The account selection functional block 780 presents a user interface on the card's display, allowing the user to select an appropriate account to use for a transaction. This functional block 780 would receive the user's selection, and then trigger the mag stripe driver, described previously, to create the account alias value on the magnetic stripe. This could also be used to provide an account alias through the smart card chip interface, or even the non-contact wireless interface.

The user authentication block 777 preferably includes a biometric solution of validating that the user interacting with the device is an authorized user. This can be achieved, for example, by using a fingerprint recognition pad. One example of such a technology is Sony's FIU (fingerprint identification unit), which is composed of a very thin silicon sensing pad along with the appropriate electronics. Since the silicon pad is so thin, it could be used on a card device. At various times during interaction, the user is prompted to supply a fingerprint recognition sample. This block captures the sample, and carries out a recognition algorithm against the authorized samples that are stored in the user identity block described above. If a match is found, the user is authorized to access the data and functionality of the device.

The piezo speaker driver 781 enables the card to use a very small piezo-electronic speaker, which is sufficient for generating various tones to assist with helping the user understand when the card needs attention, when a transaction has been completed, etc. Such speakers require only a very small amount of energy, and are therefore reasonable for use in limited-power environments such as a card device.

The display driver 783 manages the creation and display of images for the card's display device. As described earlier the privacy card can be enabled with the display using various technologies. One of them is a very thin LCD that requires no power to retain the data being displayed; only a small amount of power is required in order to set the pixels to a specific value. As the user interacts with the device, the display driver would generate the appropriate images, trigger the on-card power supply to set the screen, and then cycle the power off. In one embodiment, to minimize the amount of pixels that need to be changed, and therefore the amount of battery power that will be consumed, the driver calculates the pixel differences between the existing screen and the next screen; only changed pixels are actually modified on the screen, as opposed to generating an entire screen refresh of every pixel as in a typical computer display. This algorithm may be configured to use only a minimum amount of battery power, thus preserving energy and allowing the card to remain "active" for a longer amount of time between recharging.

The data input driver 785 manages the data input mechanism, which is preferably a touch mechanism built into the card. Alternative forms of data input include small buttons that can be built into the card, or even an external peripheral such as a keyboard that communicates through the non-contact wireless communications function. Alternately, a touch sensitive input mechanism such as a resistive film may be used.

The software agent 787 monitors the user's interaction with the device, performing various local data mining activities and keeping track of many aspects of the card's use. For example, the agent can monitor the various types of eCoupons that are redeemed over a period of time, and dynamically build up a profile of the user's preferences for various types of products. The agent can interact with other agents on other platforms (on PC's or DTV's, on web servers, etc.) to actively seek out additional eCoupons that the user might not be aware of, or to actively filter out incoming advertisements and eCoupons so that the user is not overwhelmed by a flood of data coming in and being presented on the device.

Thus, the agent 787 can be configured to actively look for content on behalf of the user as well as filter out unwanted incoming information. In one embodiment, the data may be described by XML and the agent may operate via Java applets. Other embodiments are also contemplated. Although the software agent is described with reference to FIG. 7C, it may also be implemented in alternate embodiments, including the embodiments described in FIGS. 7A and 7B.

Power for the privacy card, as described previously, may be a lithium polymer battery that supports very thin and flexible form factors. The battery can be recharged via inductive charging technologies, which thus does not require a physical connector to be attached to the card. This increases reliability and convenience for the user.

FIGS. 7a, 7b and 7c illustrate some embodiments of the privacy card. Other embodiments are also contemplated. For example, in an alternate embodiment, the privacy card may be viewed as a "virtual" device in the form of data structure that may be downloaded to the digital wallet and used through the digital wallet interface(s) to connect to a POS terminal.

Figure 8:
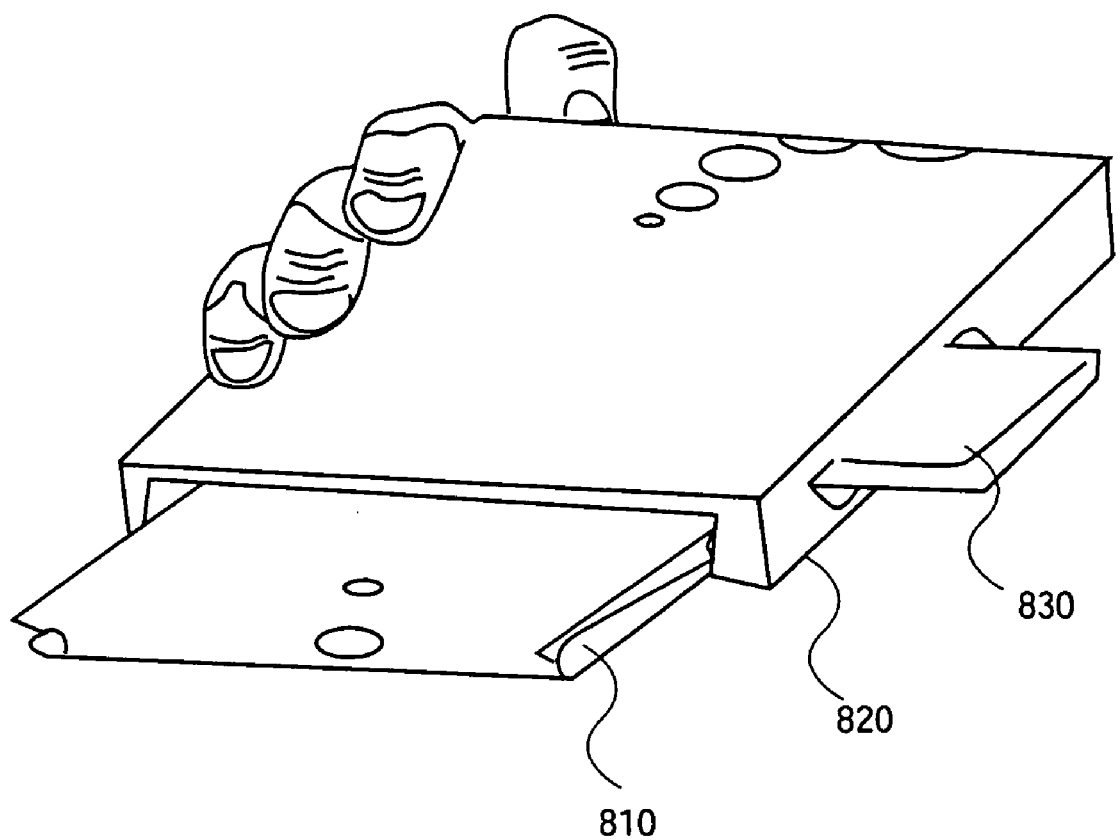
FIG. 8 is an embodiment illustrating a digital wallet and privacy card in accordance with the teachings of the present invention.

FIG. 8 illustrates a physical embodiment of the digital wallet and privacy card. In this embodiment the privacy card 810 interfaces to the wallet 820. The wallet 820 receives privacy card information and includes an interface to the TPCH. The wallet may also include extra memory 830 so that additional functions, not necessarily related to eCommerce transactions, can be performed. In this embodiment, the functionality of the privacy card may be limited with the digital wallet providing additional functionality not found on the privacy card. For example, the digital wallet may provide a display not found on one embodiment of a privacy card. The digital wallet may also provide the POS interface, e.g., wireless, bar code, smart card data, optical terminal, that legacy POS terminals may read in order to perform transactions.

Figure 9A:
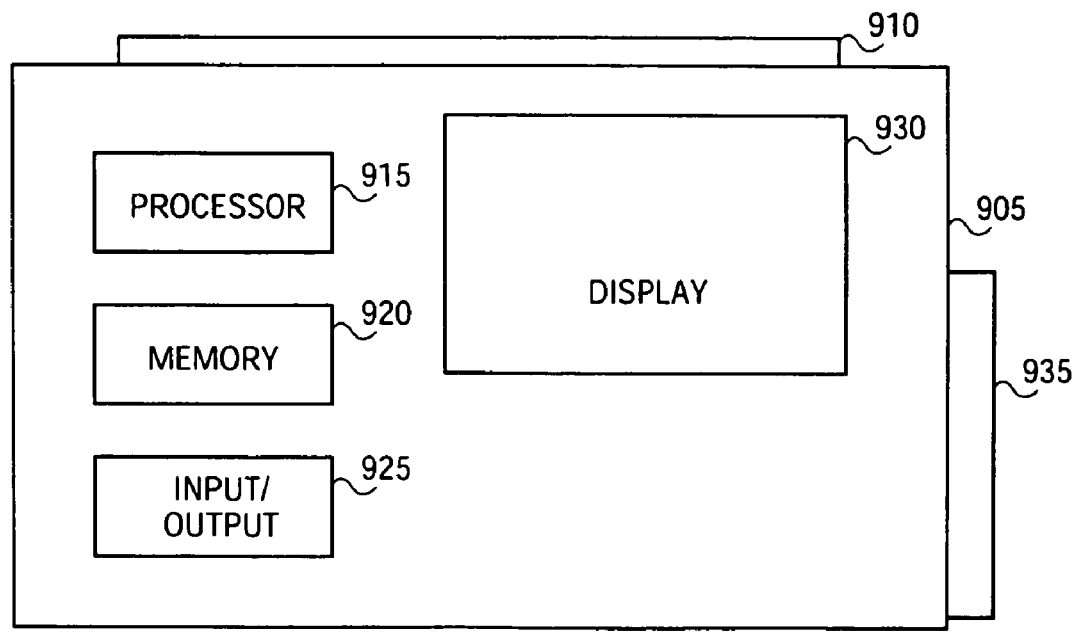
FIGS. 9a and 9b are simplified block diagrams of embodiments of a digital wallet.

One embodiment of the digital wallet is illustrated in FIG. 9a. The digital wallet 905 includes a coupling input 910 for the privacy card, processor 915, memory 920, input/output logic 925, display 930 and peripheral port 935. The processor 915 is configured to execute instructions, such as those stored in memory 920, to perform the functionality described herein. Memory 920 may also store data including financial information, eCoupons, shopping lists and the like. The digital wallet may be configured to have additional storage. In one embodiment, the additional storage is in a form of a card that couples to the device through peripheral port 935.

In one embodiment, the privacy card couples to the digital wallet through port 910; however, the privacy card may also couple to the digital wallet through another form of connection including a wireless connection.

Input/output logic 925 provides the mechanism for the digital wallet to communicate information. In one embodiment, the input/output logic 925 provides data to a POS terminal or to the privacy card in a prespecified format. The data may be output through a wired or wireless connection.

The digital wallet may also include a display 930 for display of status information to the user. The display 930 may also provide requests for input and may be a touch sensitive display, enabling the user to provide the input through the display.

The digital wallet may also incorporate functionality not illustrated in FIG. 9a. For example, a fingerprint pad and associated logic may be included to secure the device; thus, to access the device, the user would have to touch the fingerprint pad and wait for the logic to determine that the user is authorized to access the device. The digital wallet may also be configured to generate bar codes and/or magnetic stripe data for interfacing with other devices including legacy POS terminals. For example, the magnetic stripe data may then be programmed into the privacy card for use with a legacy POS terminal.

Figure 9B:
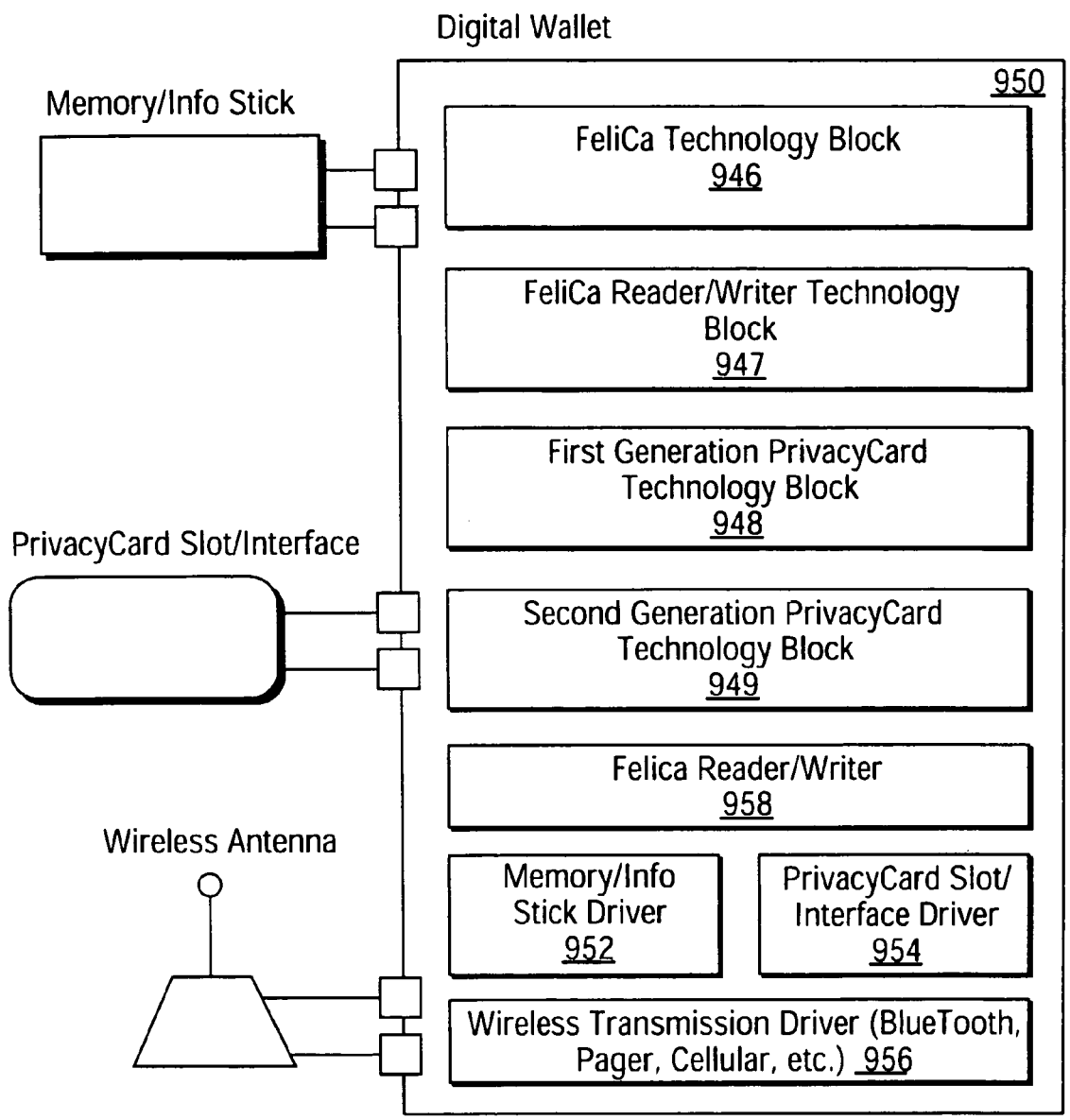

An alternate embodiment of a digital wallet is illustrated in FIG. 9b. The digital wallet 950 may be built using any of the previous technology blocks, 946, 947, 948, 949 represented by and discussed with reference to FIGS. 7a, 7b, and 7c, with the addition of Memory/Info Stick support block 952, and the privacy card interface slot 954. Of course, the physical manifestation of many of the technologies in the digital wallet will likely be different from those in the privacy card devices, mainly because of the availability of physical real estate in which to package technology. Examples of different physical representations would include the screen, fingerprint recognition unit, speaker, etc.

The various elements of the privacy card, such as the speaker, fingerprint recognition unit, screen, and battery, can all be included in the digital wallet 950. However, they might be more robust or feature-rich in the case of the digital wallet, because there is more physical space in which to store the required technologies.

For example, the digital wallet screen could be a small, high resolution color LCD, while the privacy card's LCD screen would likely be only black & white, and of limited resolution.

The memory/info stick driver 952 allows the digital wallet to accept memory stick and info stick devices. The info stick is mechanism that puts a CPU, ROM/RAM, etc. on a memory stick device. By inserting an info stick into the digital wallet, the functionality of the wallet device can be extended with the functions of the info stick.

The privacy card slot driver 954 manages the wallet-side of interaction with a privacy card device. When a card is inserted into the slot, this driver will initiate the necessary security steps to ensure that the card is a legitimate device; query the card for its basic capabilities and information that it might be holding; etc. The driver interacts with the FeliCa reader/writer mechanism to facilitate this communication.

The wireless transmission driver 956 manages the built-in wireless capabilities of the digital wallet. These wireless communications functions are longer-range that those of the FeliCa-type wireless, which is typically only a few inches. Examples of these wireless capabilities include cellular, pager, IEEE 802.3, etc. These allow the digital wallet to communicate over distances of a few meters to many miles, depending on the necessary application.

The FeliCa reader/writer block 958 allows the digital wallet to communicate with the privacy card device when it is inserted. Thus, the digital wallet acts as an external POS terminal as far as the privacy card is concerned, with respect to communications protocols. This mechanism is one embodiment for how the digital wallet communicates with its privacy card, and can be used for all interaction. Alternate forms of communication could be through the smart card chip, through the magnetic stripe contact, etc.

In one embodiment, the digital wallet is intended to be the means by which the privacy card interfaces with the user and eCommerce system. In one embodiment, the digital wallet stores eCommerce related data on behalf of the user including transaction histories and meta-account information needed to carry out a transaction using the transaction privacy clearing house function of the system. In one embodiment the meta account information may be an abstraction of the user's real identity as opposed to the actual user's name, address, etc. For example, the TPCH keeps records of the user's real bank account numbers, but assigns a different number for use by retailers and POS terminals. For example, an actual Bank Visa account number may be 1234 0000 9876 1423 could be represented as 9999 9999 9999 9999. This number, in association with the transaction card's ID, would enable the TPCH to know that the Bank's account 1234 0000 9876 1423 was actually the account being used.

The purpose of this data is to abstract the user's identity while at the same time providing the necessary information for the transaction to be completed.

A digital wallet may also support secure user authentication mechanisms such as PIN code, or fingerprint recognition, for the purposes of a user accessing data or carrying out a transaction.

In one embodiment, the digital wallet is configured to operate in conjunction with a POS terminal. In one embodiment the connection with the POS terminal can be a wireless connection. Alternately connections may be made through a wired connection, magnetic stripe emulation or smart card emulation or through using a coupled privacy card.

The digital wallet can also be used to reconcile data among several privacy card devices, so that all the devices share the same data history. In this embodiment, a convenient solution is provided for users who prefer to use several different cards and need to keep the cards in separate locations but have consistent information. For example, while traveling many people may keep one card in their carry-on luggage, and a separate one in a suitcase. This way if one is lost or stolen the other is available as backup. Thus, a user may have redundant transaction devices that are kept synchronized with each other.

In addition to the eCommerce functionality, the digital wallet may be configured to provide other functional capabilities. For example, the digital wallet can be configured to contain extra user information, such as passport numbers or medical records. The digital wallet may contain personal digital assistant functionality such as a calendar. An extra memory slot can be used to insert memory cards containing digital photo albums for viewing on the screen or a slot on the device may receive a card that has pager or cell phone functionality built-in.

In one embodiment the digital wallet may have a touch sensitive screen for data display and input, and a slot into which the privacy card may be inserted for communications with the privacy card. Optionally, it may also include a memory slot for insertion of memory devices. In one embodiment, the privacy card is inserted into the digital wallet for purposes of accessing privacy card data and for enabling it to be used with a legacy POS terminal (e.g., a terminal that requires a magnetic stripe or smart card contact).

The digital wallet may have a user authentication mechanism such as fingerprint recognition. This might be reflected as a fingerprint recognition pad on one surface of the device. In one embodiment, the digital wallet is configured to only work with an authorized privacy card. In an alternate embodiment, the digital wallet is configured to work with more than one privacy card.

In one embodiment, the privacy card is designed to work in conjunction with a specific digital wallet or similar type of device or devices. At the time of manufacture, or during an initial setup stage in a processing facility such as a bank, the card is configured with user and digital wallet-specific information. The card is then delivered to a specific user. Aspects of the card's features and functionality are hidden behind a security mechanism, rendering the card useless to unauthorized users.

Figure 10:
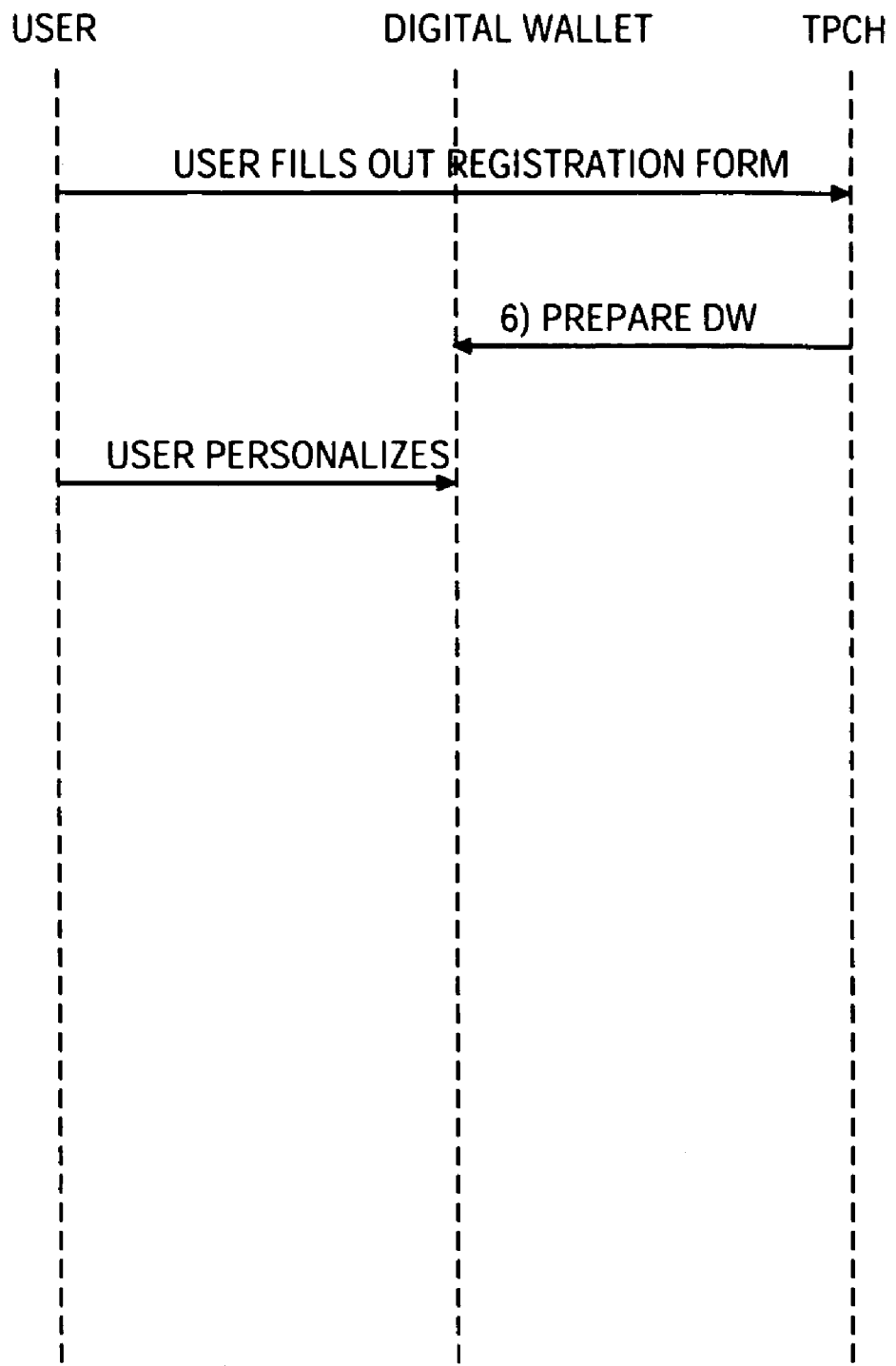
FIG. 10 illustrates one embodiment of process for setup of a digital wallet.

One embodiment of a process to set up a digital wallet for operation with a privacy card to perform transactions is illustrated by FIG. 10. The user or issuing facility (e.g., bank) may set up the digital wallet and/or privacy card. As noted above, in one embodiment of the privacy card, the privacy card is coupled to a digital wallet and the digital wallet couples to a POS terminal that interfaces with the TPCH to perform a transaction.

In one embodiment, the digital wallet, for security, is configured to only work with a specified authorized privacy card. In one embodiment the user visits a web site or alternately, an authorized entity such as a bank, and fills out a form to be a new user of the digital wallet, or fills out a paper form and sends it to a specified address. This may or may not involve some kind of requirement to purchase the device. As part of the registration process, the user may be required to answer a variety of questions that serve not only data mining purposes, but also security purposes. Also as part of the process, the user is requested to provide a variety of questions and answers that only the user would be able to know. Additional data that the user must provide might include existing financial accounts that will be accessed via this device (credit/debit accounts, savings/checking, loyalty cards, etc.).

At the processing facility, a device is prepared that includes some basic information about the target user and necessary account information. Also included is a set of questions (and the correct answers) that will be asked of the person who receives this device in the mail. The device may also be encoded with a secret PIN code that must be entered to begin the user-confirmation procedure.

The user receives a confirmation of registration, which includes a secret PIN code that may be used for the first-time setup procedure. The means of receiving this PIN code might be a secure email message or a standard paper-based mail message. The confirmation message may not typically include any of the questions and answers that were used during the sign-up process.

Under separate cover, the user may receive the digital wallet with a simple set of instructions for how to personalize and activate the device. The instructions might be on paper, or might include instructions that are presented on the digital wallet screen as the process is carried out.

In one embodiment, the personalization process may be as described below. The user turns on the digital wallet (for example, touches the fingerprint recognition pad in order to turn on the power). The device performs its startup procedure, and detects that is has not yet been personalized. Thus, it first prompts the user to enter the secret PIN code. If the PIN code entry fails, the user is prompted again. Ideally, the user is given a finite number of chances to enter the data. After the last failure, the device permanently disables itself and thus becomes useless. It may also display a message requesting that the device be returned to an authorized facility.

Assuming successful PIN code entry, the user may then be prompted to answer several of the security questions that were entered into the device at the processing center. Some of the questions might require data entry, and others might be constructed as multiple-choice, with both the correct as well as incorrect answers supplied. Assuming successful response to these questions, the user may then be prompted to enter secure personal identification information such as fingerprint data. In one embodiment in which fingerprint data is used, the user is prompted to enter fingerprint data by successively pressing one or more fingers against the recognition pad. The device prompts the user for each fingerprint that must be entered, for example, using a graphical image of a hand with the indicated finger.

The fingerprint data entry process may be performed at least twice, to confirm that the user has entered the correct data (using the correct fingerprint). If confirmation succeeds, the device writes the fingerprint image data into write-once memory, or other memory that is protected from accidental modification. If confirmation fails, the user is prompted to start over with entry. Failure to reliably enter the fingerprint data after a finite number of tries will result in the device permanently disabling itself, and optionally providing an on-screen message to the user to go to a secure processing facility (such as a bank) to complete the process. After successful personalization, the device is then ready to be used for the initial set of services that the user requested during the registration process. Once the device has been initialized for secure transactions, additional services could be downloaded to the device.

Figure 11:
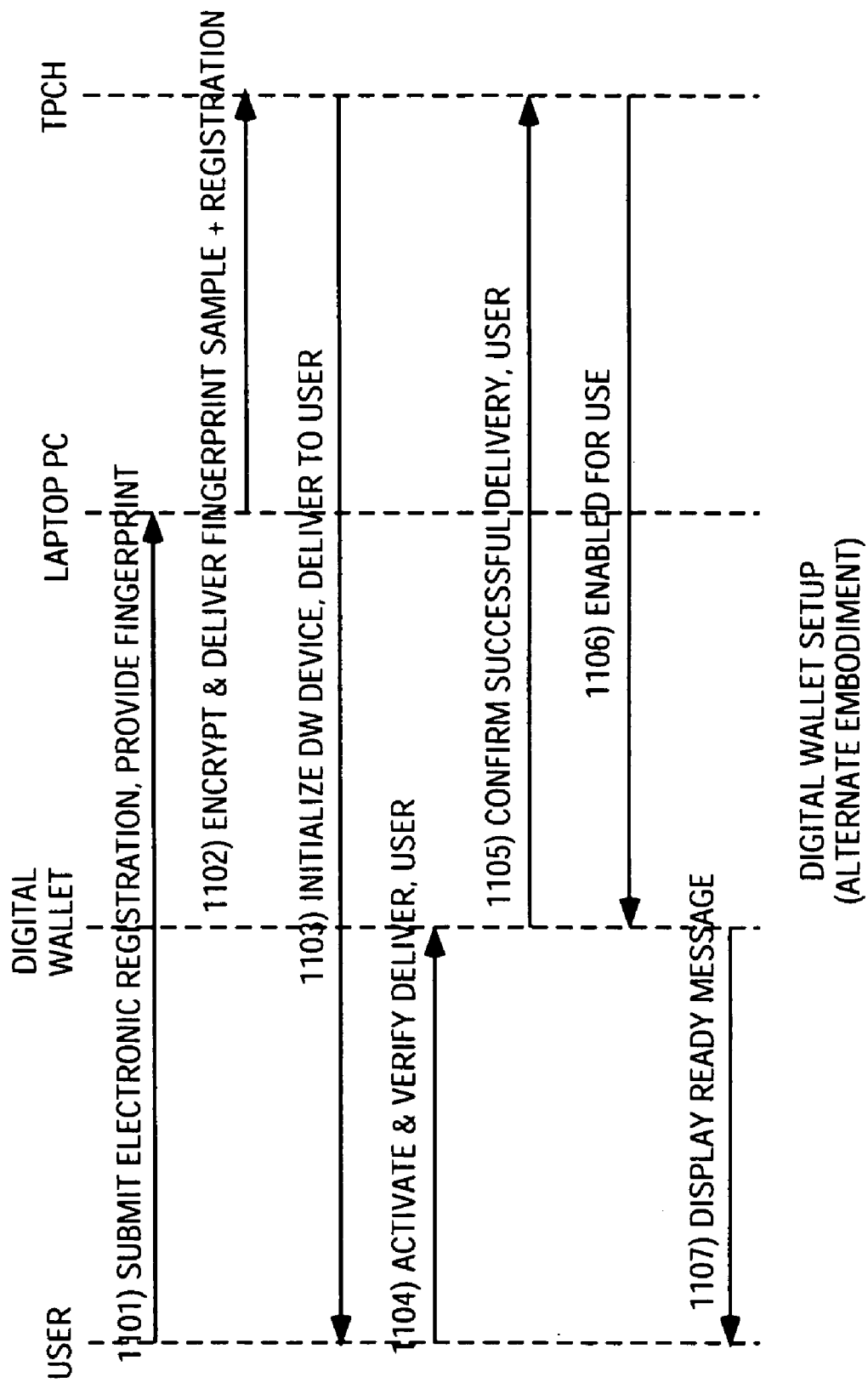
FIG. 11 is an alternate embodiment of process for setting up a digital wallet.

An alternate embodiment for setting up a transaction device such as a digital wallet is shown in FIG. 11. In this embodiment, the process illustrates how to securely get the user's fingerprint information into the device for personalization in a manner that does not require the user to go to a processing facility such as a bank and is thus more convenient for the user.

This method presumes that the user already has some kind of fingerprint scanning device that they can easily access. In the future, such devices are very likely to be built directly into PCs, in an effort to provide secure access to those machines and their content. By utilizing these devices, this alternative embodiment becomes quite practical.

The embodiment described assumes that the user has a PC with an integrated fingerprint recognition pad or an FIU peripheral device, and that the appropriate security software exists. It may be incorporated into a web browser on which a transaction device registration form was displayed and filled out by the user, or in a dedicated software application for registration.

At step 1101, after filling out the transaction device registration form, the user presses the "submit form" button or other appropriate trigger mechanism. The user is prompted to touch the fingerprint recognition pad in order to provide non-repudiation data (the user is "signing" the form and verifying that the user wants to register), and is providing the fingerprint identity sample that will be stored in the transaction device by the processing facility, for example, the TPCH. At step 1102 the PC software encrypts all of the information and delivers it to the TPCH over a secure connection.

At step 1103 the processing facility creates a new transaction device and personalizes it with the fingerprint and other data that was collected during registration. The processing facility delivers the transaction device to the user.

At step 1104, upon receiving the transaction device, the user activates it for the first time. The device goes through its startup procedure and determines that it has not yet verified successful delivery to the valid user. It notifies the user that the setup procedure should be finalized, which requires the user to supply a fingerprint sample by touching the recognition pad. It might also require the user to answer a few questions just as an extra precaution.

At step 1105, once the software agent inside the transaction device is satisfied that the authorized user has received the device, it contacts the processing facility to confirm that delivery and authorization was successful. It might do this via a web browser on a PC or direct wireless connection.

At step 1106, the processing facility finishes its registration procedure and transmits a final signal to the transaction device that it can enable itself for use. The transaction device notifies the user that setup has finished and that it can now be used, step 1107.

Embodiments of processes for initially configuring a digital wallet are described above. It is apparent that the digital wallet can also have additional personalized information added in the future by visiting a secure facility such as a bank, DMV, etc. or interfacing remotely, either through the Internet or direct connection, to an authorized facility.

Similar processes may be performed to set up a privacy card. The user fills out registration data and provides it to an issuing or authorizing facility. If the privacy card is intended to work only with a specific digital wallet, then the issuing facility would obtain a unique identifier of the specific digital wallet. This can be obtained from the digital wallet issuing facility, or directly from the digital wallet itself via a secure electronic transaction. As an example of the latter, the digital wallet can interact with a web browser, providing the necessary digital wallet identification information to the browser or other network software, which is then transmitted to the issuing facility. The facility may contact the TPCH to confirm that everything is okay and then downloads new data. This entire transaction can be encrypted for security. In an alternative embodiment, the user may take the digital wallet to an issuing facility, where the digital wallet identification data can be directly obtained from the device in a secure manner.

Thus, in one embodiment, it is not necessary for the issuing facility to obtain user fingerprint or other identity information, because the digital wallet will not work, and will therefore not interact with the privacy card, unless the user is validated by the digital wallet during a transaction.

If the privacy card is intended to work with any digital wallet but with only specified users, then it is preferable for the issuing facility to obtain the necessary user identification information. Normally this would be fingerprint data, but it might be any information that will satisfy security requirements. This data can be obtained in a manner similar to that described for the digital wallet identification value; in this case, the data being transmitted would be the fingerprint data.

The facility creates the privacy card device configured for the specified digital wallets and authorized users, recording the appropriate information into permanent storage in the privacy card.

Figure 12:
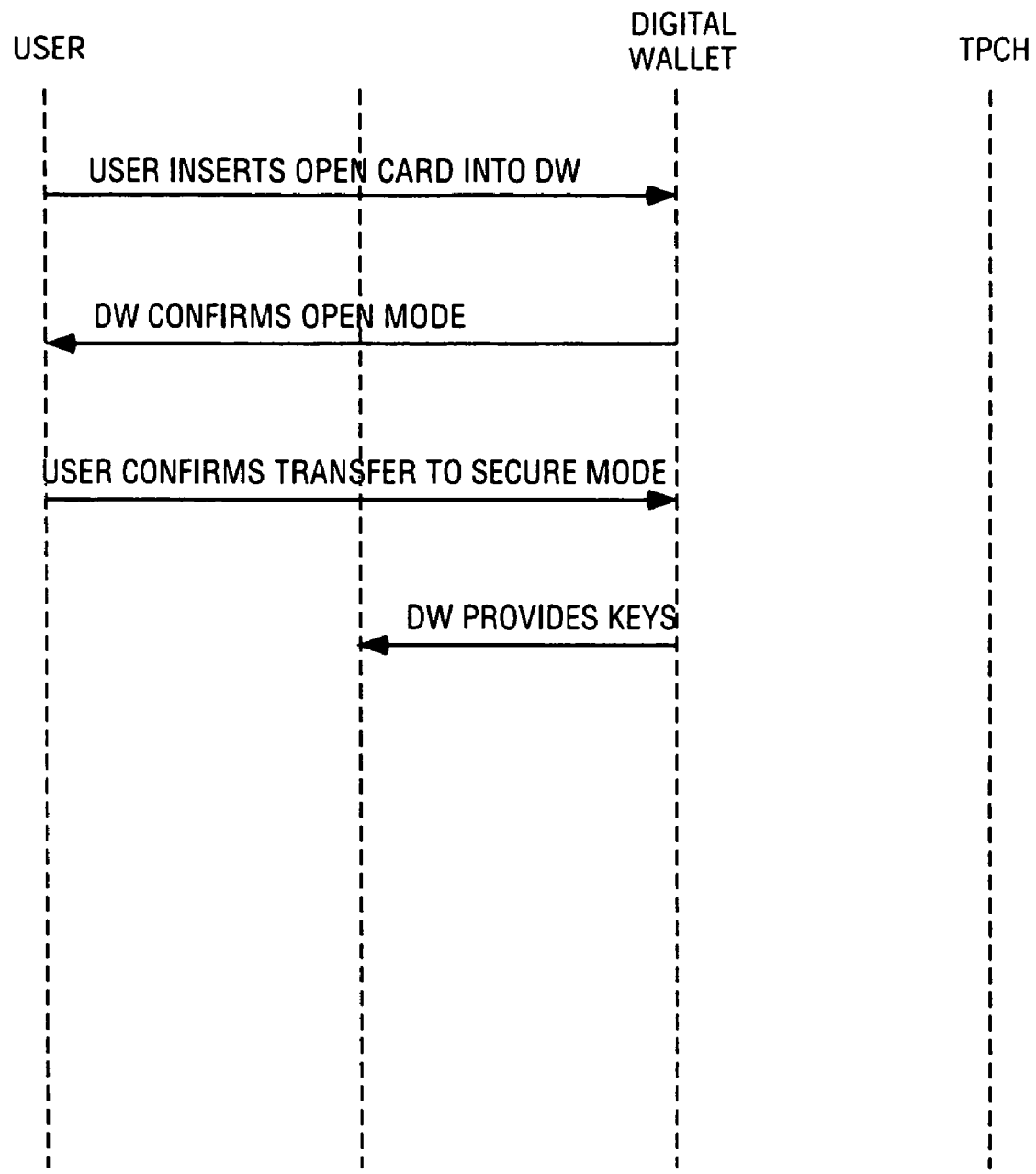
FIG. 12 illustrates one embodiment of a process for conversion of an unsecured card to a secure card.

As noted earlier, in one embodiment a privacy card may operate in an open mode and subsequently be converted to a secure mode. One embodiment of the process is described with reference to FIG. 12.

The user receives a standard "non-secure" card such as a phone card from a retailer or a credit card from a bank, either by a purchase or registration procedure. When in open mode, the card does not contain the necessary user-specific information used in a secure mode. The user inserts the open mode card into a digital wallet. The digital wallet examines the card and determines that it is currently operating in open mode, and that it does not currently have a secure mode.

The digital wallet displays a message to the user, explaining that the card is currently in open mode, but it can be converted to a secure mode if desired. Alternatively, the digital wallet can have a menu option that triggers the conversion process, which can be selected by the user at any time.

Once the user confirms that conversion to secure mode is requested, the digital wallet requests configuration options from the user. This might include the option to leave the card in dual mode or multi-mode; the option to include or exclude specific individuals known to the digital wallet as valid users of the card; the option to use the card with only this digital wallet or with any digital wallet, etc.

Once the user supplies the necessary configuration information, the privacy card and digital wallet carry out a secure exchange, for example, with the digital wallet assigning the equivalent of one or more private keys to the card. These private keys can be composed of user-specific data obtained from fingerprint recognition, the digital wallet identification information, TPCH etc. These keys become the means by which the card is accessible only to specified individuals or only to the particular authorized digital wallet. The privacy card records the keys in its own permanent, secure memory. Thereafter, subsequent access to the privacy card by the user requires secure exchange between the card and digital wallet.

In one embodiment, a POS terminal is the link between the digital wallet or privacy card and the transaction privacy clearinghouse (TPCH) of the eCommerce system. The main purpose of the POS terminal is to establish a secure transaction connection between the transaction device and the TPCH and to transfer transaction data to the TPCH for completion of the transaction. The POS terminal can also be used to transfer data from the TPCH to the transaction device. An example of data that may be transferred, is the distribution of electronic contents such as electronic coupons, which might pass directly from the TPCH to the transaction device.

In one embodiment there is a level of consistency applied to home-based and in-store retail purchase functionality. To achieve this, there may be three types of POS terminals, the legacy Retail POS terminal, the New Retail POS terminal and the personal POS terminal.

The legacy Retail POS terminal represents existing terminals that use a bar code, a magnetic stripe or smart card input. The new retail POS terminal as referred to herein may include those terminals that are particularly configured to interface to the digital wallet or privacy card described herein and may not use a bar code, magnetic stripe or smart card contact input. The personal POS terminal, discussed herein, refers to a home-based POS terminal.

In one embodiment, the basic transaction experience is the same for each type of POS terminal. In a retail situation, the user or a store clerk specifies the items to be purchased. For example, this may be achieved by scanning items across a barcode scanner or a similar device. For an Internet-based purchase, the user clicks on several items to fill an electronic shopping cart or something similar on a website. Once the purchase has been specified, the user enables the transaction device. In one embodiment this may be the digital wallet, the digital wallet with a coupled privacy card, or a privacy card with the communication functionality installed within the card.

In one embodiment, a user enables a transaction device with a security mechanism such as fingerprint recognition. Other secure solutions, such as a PIN entry, may also be used.

In one embodiment, if the POS terminal does not support wireless communication with a transaction device, the transaction device may include a magnetic stripe or barcode generator to generate the privacy card identification information to complete the transaction.

In one embodiment, if the POS terminal does not support electronic receipts (e.g., existing legacy POS terminals), the user may receive the standard paper receipt which must be signed by hand. Alternately, the system may be configured to be paperless wherein the receipt is electronically stored on the user's transaction device, transmitted to the user's email account, or placed at a location in a network, e.g., personal account information in a bank network, accessible by the user.

The signature, which in one embodiment may be a fingerprint, may be electronically captured and the system may be configured such that the display shows a confirmation message to enable the clerk to visually check for verification. The privacy card/digital wallet may be configured to be used with the legacy POS terminal and the terminal may process the transaction in a standard way, by dialing into a central authority to carry out the financial processing. In this situation it would be possible to preserve the user's identity because there is no requirement to expose name, address, etc.

In an alternate embodiment, it may be possible to preserve the user's privacy by using two different account numbers. One number may be for a standard account for use at existing legacy POS terminals as the legacy terminals do not need to provide user identity information and the system may be configured to not provide such information. The other number may be a new privacy account number for use with newer terminals which are compliant with the privacy card system.

In one embodiment, the legacy POS terminals are configured to dial into the TPCH, which then facilitates the transaction as usual. In return, the TPCH returns the basic purchase data such as a list of items purchased along with a reference to the transaction device (e.g., the digital wallet ID or privacy card ID) so that the store can keep track of its inventory usage and also have a record of the user who purchased the items. In this situation the user information is not the user's identity but an electronic alias reflective of the transaction device, i.e., digital wallet or privacy card, used. An alternate modification would be to modify the legacy POS terminal software to treat the transaction in the same way that the traditional credit cards are used; the store keeps track of all data directly and dials into a location to carry out the transaction (in this situation the TPCH). In this embodiment the TPCH does not have to send back any data since the store already has it, but the store does need to send the purchase data to the TPCH, which needs this information to build its database of purchase histories.

To interface with existing legacy retail terminals, the transaction device may be configured to simulate a magnetic stripe media readable by the legacy retail terminals. In one embodiment, the transaction device is configured to provide dynamically generated bar codes readable by a POS terminal. Thus, when a user purchases items through a legacy retail terminal using the transaction device, the magnetic stripe and/or barcode generated data is forwarded along with details of the purchase to the TPCH for processing.

A retail POS terminal may also include a display device that is used by the clerk performing the transaction. The display device may display information that is received from the privacy card, such as the user's picture, etc. This is a security feature that allows the clerk to check on certain items of data that can help to initially confirm that the user is authorized. The transaction device may therefore contain an encoded encrypted image that is transmitted to the POS terminal. The terminal decodes the image and presents it on the clerk's display. This action may be performed concurrently with the transaction processing (i.e., verifying that the card is legitimate etc.). Fingerprint recognition may also be provided by the system for security.

In an embodiment that utilizes a new retail POS terminal that supports wireless communication, the user may enable the transaction device via a security mechanism and the transaction device may then communicate with the POS terminal directly through the wireless communication mechanism to carry out the transaction.

Figure 13:
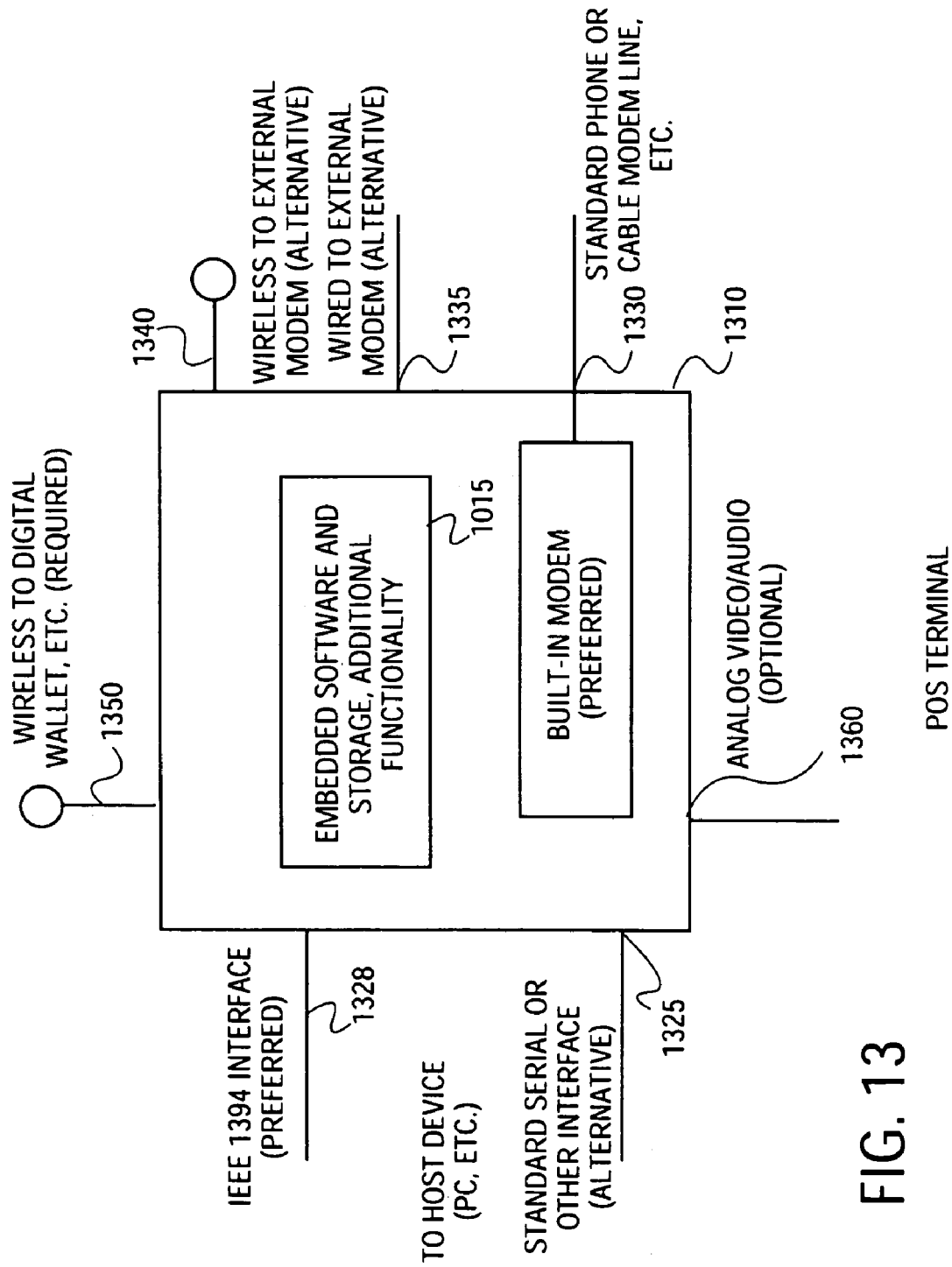
FIG. 13 is a simplified block diagram of one embodiment of a POS terminal.

One embodiment of a POS terminal is shown in FIG. 13. Terminal 1310 includes message logic and processing circuitry 1315 and may also include embedded software and storage and additional functionality to perform the functions of the POS terminal. A variety of interfaces may be utilized. For example, an IEEE 1394 interface 1320 may be configured to couple to a host device. A serial interface 1325, modem 1330, 1335, 1340 and a connection to a transaction device 1350 may also be included in the terminal 1310. The POS terminal 1310 may also drive an output video or audio signal device such as a display 1360.

The POS terminal may collect the necessary information from the transaction device, e.g., the digital wallet, combine it with the purchase data, and send it to the TPCH. The TPCH may then authorize the transaction, store data relevant to the transaction in its records and trigger a financial transfer to the vendor's account. The POS terminal may then receive verification that the transaction is complete, and transfer the wireless receipt to the transaction device. Additional data can be transferred as well, such as electronic coupons and other promotional material.

Many retailers use a loyalty card system whereby the retailers award additional product discounts for their customers who use the card and purchase selected items. The main use of these programs is for data mining.

In one embodiment, the transaction device would be programmed with loyalty card account information, which would be an account maintained only by the retailer. This account is associated only with the transaction device, not with a specific human user, thus preserving the user's privacy and identity protection.

During a transaction, the clerk would request the loyalty card. The loyalty account information can be entered in a manner as is typically done today: either by a barcode which would be displayed on a screen of the user's transaction device, by an account number that is programmed into a magnetic stripe of the transaction device, or by wireless transmission.

The transaction device may be configured to carry both the payment and loyalty account information in the same magnetic stripe, because these stripes actually are composed of three separate bands. If the current legacy POS terminal in the retail store is able to read the other magnetic stripe bands, then it can read both accounts at the same time as the card is swiped through the reader.

In an embodiment of a system that uses a personal POS terminal, the user is likely to be making a purchase on-line while at home. The user specifies the items to be purchased on the appropriate web pages. When the items have been selected, the user clicks on a transaction device icon to trigger the transaction to be performed. One embodiment of the transaction device icon is displayed on the web page when the browser detects that a personal POS terminal is present. This detection may be handled by a custom browser plug-in or by a fully customized browser. The user may then be prompted to place the transaction device next to the user's computer or other device and enable it by using a built in security mechanism such as fingerprint recognition. The transaction device then communicates with the personal POS terminal, each of them authenticating the legitimacy of the other.

In one embodiment the vendor's website supports a standard such as ECML (electronic commerce markup language) that specifies a standard set of information for an electronic purchase. The web browser passes the ECML purchase order to the personal POS terminal which has verified through the security mechanism that the user is authorized to carry out this transaction.

In one embodiment, the personal POS terminal communicates with the TPCH on a dedicated connection, not the same Internet connection. This enhances security by not exposing the transaction data to any security weaknesses of the Internet.

The personal POS terminal accumulates transaction history data and either stores it locally or passes it to an appropriate location in the user's system, such as Quicken® (Quicken is a trademark of Intuit Corporation). If any electronic coupons or other related items are available they are also passed to the TPCH as part of the transaction.

In one embodiment, the personal POS terminal allows the user to have the equivalent of a retail POS terminal for use at home or wherever the user may wish to access it. The personal POS terminal may be configured to provide the same level of security for transactions as standard retail based POS terminals. It may allow non-retail, also referred to as "brick and mortar" electronic commerce transactions over a secured non-Internet connection. In one embodiment, it facilitates a portability solution and allows a user to carry out brick and mortar electronic commerce transactions from any location. In addition, it may provide an alternative, non-PC based location from which to securely execute utility applications and to store data, thus enhancing data security and protection from danger such as PC viruses and hard disk crashes.

The personal POS terminal may include data encryption technologies such as those used in retail-based POS terminals. In addition, security protocols may be used including user authentication and authentication of the transaction devices themselves. By providing this additional security, an increased level of user confidence is provided. In one embodiment, the personal POS terminal is a physical device designed to be portable so that the users can have the same level of secure non-retail based transactions from almost any location they desire. The circuitry in the device may function as a small processing system to provide additional functionality.

The input/output of the personal POS terminal may function to transmit and receive wireless data between the terminal and an external device such as the transaction device. The terminal may store all electronic commerce transaction data within itself, for example, in flash memory, rather than transferring it to the coupled device, e.g., computer disk. This has several security benefits including greater reliability, less vulnerability to viruses and other hostile PC-based software, and the ability to have the data available when the POS terminal is configured as a transportable device. In an alternate embodiment, the terminal is used to transfer data from the transaction device to one or more destinations on the host device, such as accounting programs executing on the host device.

Figure 14:
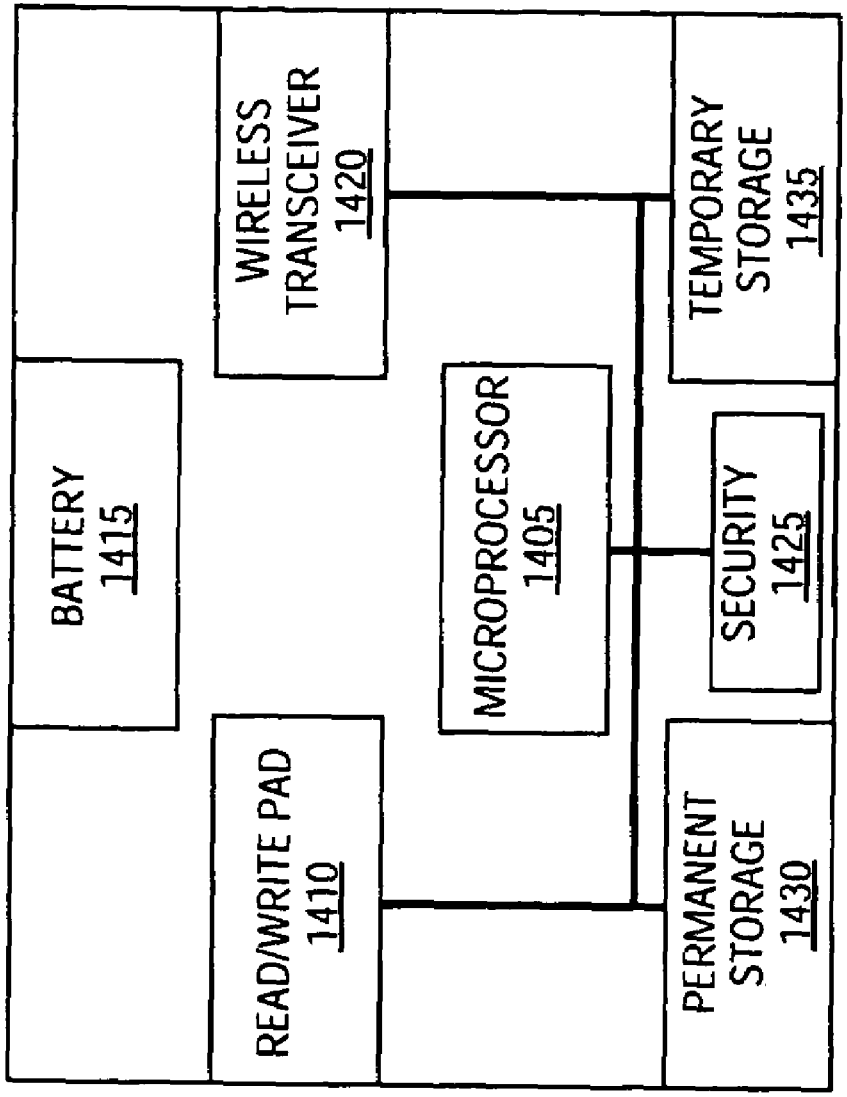
FIG. 14 is a simplified block diagram of an alternate embodiment of a POS terminal.

FIG. 14 is a simplified block diagram of one embodiment of a personal POS terminal. As described herein, a personal POS terminal is a POS terminal that may exist in the home environment. In the embodiment shown in FIG. 14, the personal POS terminal includes a processor 1405, input/output pad 1410, power supply 1415, wireless transceiver 1420, which may be used to interface with the transaction device, security function 1425, permanent storage 1430, and temporary storage 1435.

In one embodiment, the software executing on the personal POS terminal may include an internal driver software that executes locally to drive the wireless transceiver, software to store incoming data into memory and to control input/output to a computer (e.g., PC) coupled to the personal POS terminal.

Host application software may be stored on the personal POS terminal and uploaded by the host system for execution. The application may be written in a platform specific format or platform neutral code such as Java. Updated versions of the software may be stored on the personal POS terminal as needed. Application software may also be executed locally on the personal POS terminal. In one embodiment, a stored data file containing data accumulated from associated devices such as the privacy card and digital wallet may only be accessed by an authorized application executing on the personal POS terminal or host device (e.g., PC).

The personal POS terminal storage area may also contain a user application that gets uploaded to the PC and executed. This application, once a user-triggered data transfer is performed, performs the necessary authorization tasks to ensure that the data transfer is legitimate and sends the data to applications, such as Quicken® via an operating system specific interapplication communication (IAC) mechanism. It also allows the user to perform administrative tasks on the data, such as deleting all data from the remote (e.g., digital wallet) devices, to free up storage space. In one embodiment, the personal POS terminal can receive data from any remote device, including the transaction device, and pass it along to other authorized applications on the host device.

Security is always an issue as the transaction device, e.g., privacy card and/or digital wallet, contains sensitive information, such as financial transactions. The system may include a mechanism that prevents casual misuse or unauthorized access to that data. In one embodiment, the transaction device requires the user to activate it before the device is capable of transmitting data. The activation procedure may involve performing a security operation such as entering a PIN code on a numeric pad built into the device or opening a physical lock of some kind. Thus, if the personal POS terminal can receive data from the device, then it can assume that the user has authorized the transmission of data. In an alternate embodiment, a user authorization process is carried out by the personal POS terminal and the host application. In one embodiment, the personal POS terminal reads a PIN code or other authorization signature from the transaction device. The user enters in a corresponding value into the host application. The application then feeds the user's entered data to the personal POS terminal, the terminal then checks to see if the value entered by the user matches what was read from the device. Alternately, mutual device verification techniques may be utilized. Still, alternately, a combination of the above approaches may be used.

In one embodiment, the personal POS terminal is a self-contained mechanism with wireless communication capability for communicating with a transaction device. The personal POS terminal may also include software that is configured to communicate with the PC and the eCommerce system to perform the transaction. In one embodiment, the personal POS terminal includes a custom driver that gets uploaded from its internal storage to the host PC and executed. The custom driver can be configured to provide enhanced security. In addition, the custom driver may be configured to manage the display of information from the personal POS terminal to the PC screen and the input of data from the PC's keyboard to the personal POS.

In one embodiment, the personal POS terminal is configured in a self-contained execution environment that operates in parallel with the host (e.g., PC) platform. In one embodiment, the personal POS terminal may include data storage, memory and a processor that executes code that performs such support applications as web browsers and accounting systems. By keeping the applications and stored data on the personal POS system, the system provides enhanced levels of security and data protection for the user. More particularly, the user information and transaction data is never transferred onto the PC's hard disk. In addition, by utilizing a self contained execution environment, the eCommerce system is less dependent on the processing capabilities of the host platform (PC) that the user uses.

In one embodiment, certain functionality of the PC is utilized. In one embodiment, a coupled host device's keyboard is used for input and the host device's display is used for viewing. All other processing including communications is handled from within the secure environment of the personal POS terminal. For example, the personal POS terminal may rely on the PC having a modem that is used for connection to the TPCH.

The personal POS terminal may be configured to be mobile, such that the user may take it out of the home environment. For example, the user may take the personal POS on a business trip and from a portable PC continue to perform secure transactions from within a hotel room or business office. In such an embodiment, the records of the transactions are kept in the personal POS terminal just as if these were transactions that are carried out at home. In such a configuration, the external communications from the personal POS to the TPCH would have to accommodate various communications systems such as the business PBX system. In one embodiment, an adaptable soft modem architecture resident on the personal POS terminal would be implemented. Alternately, a wireless (e.g., cellular) link may be used.

Figure 15:
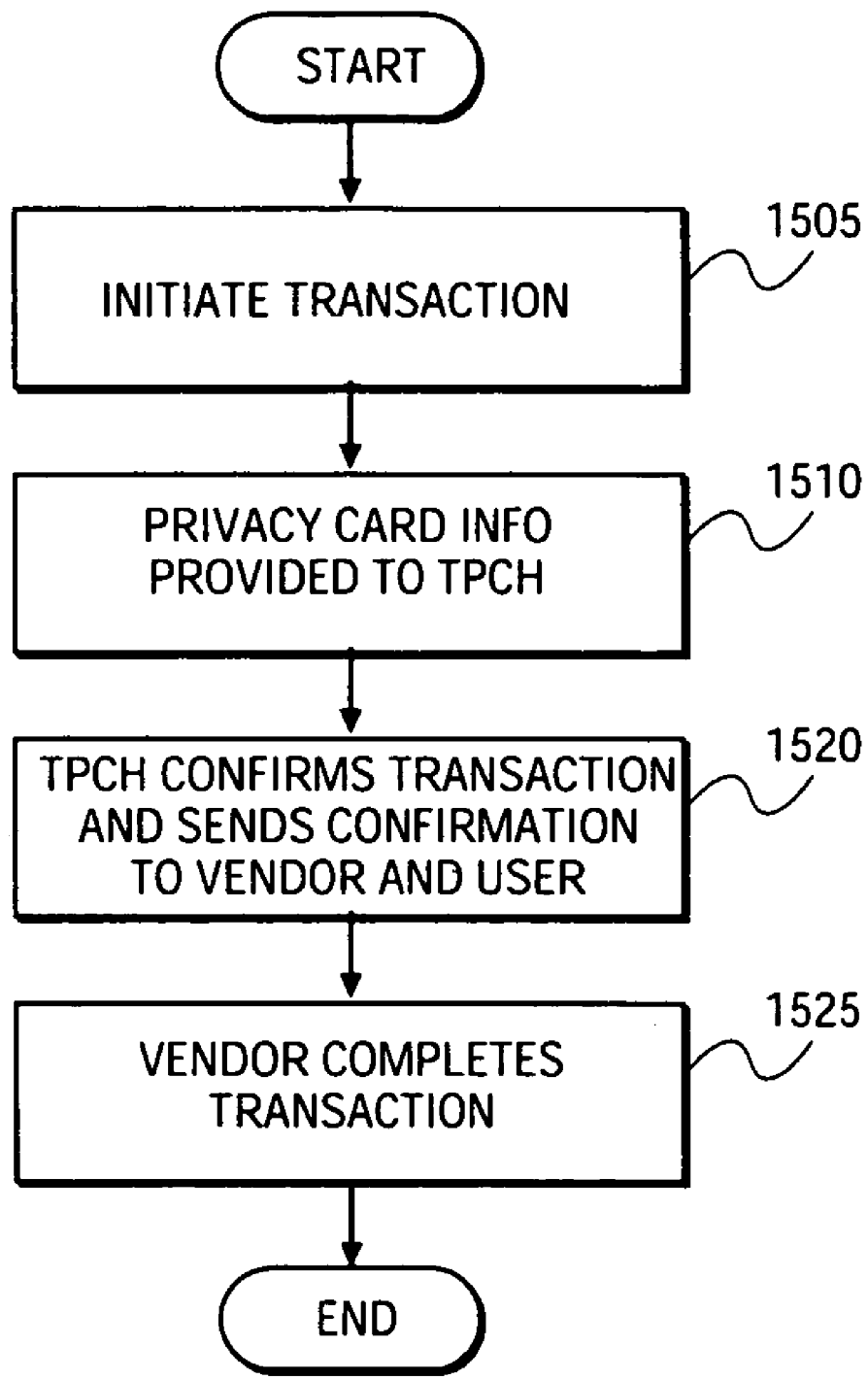
FIG. 15 is a simplified block diagram of one embodiment of a process to perform a transaction in accordance with the teachings of the present invention.

As noted above, by using the transaction device and the eCommerce system described herein, a user may be able to perform electronic commerce transactions without revealing the user's identity. A simplified flow diagram of one embodiment of the process to perform a transaction is as illustrated in FIG. 15. At step 1505, the user initiates the transaction. This transaction may be one over the Internet or through a retail store or bank. Other transaction networks may also be accessed. Privacy card information is provided to TPCH, step 1510. The TPCH, at step 1520, confirms the transaction and provides the confirmation to the vendor and the user. At step 1525 the vendor completes the transaction without knowledge of the identity of the user.

Figure 16:
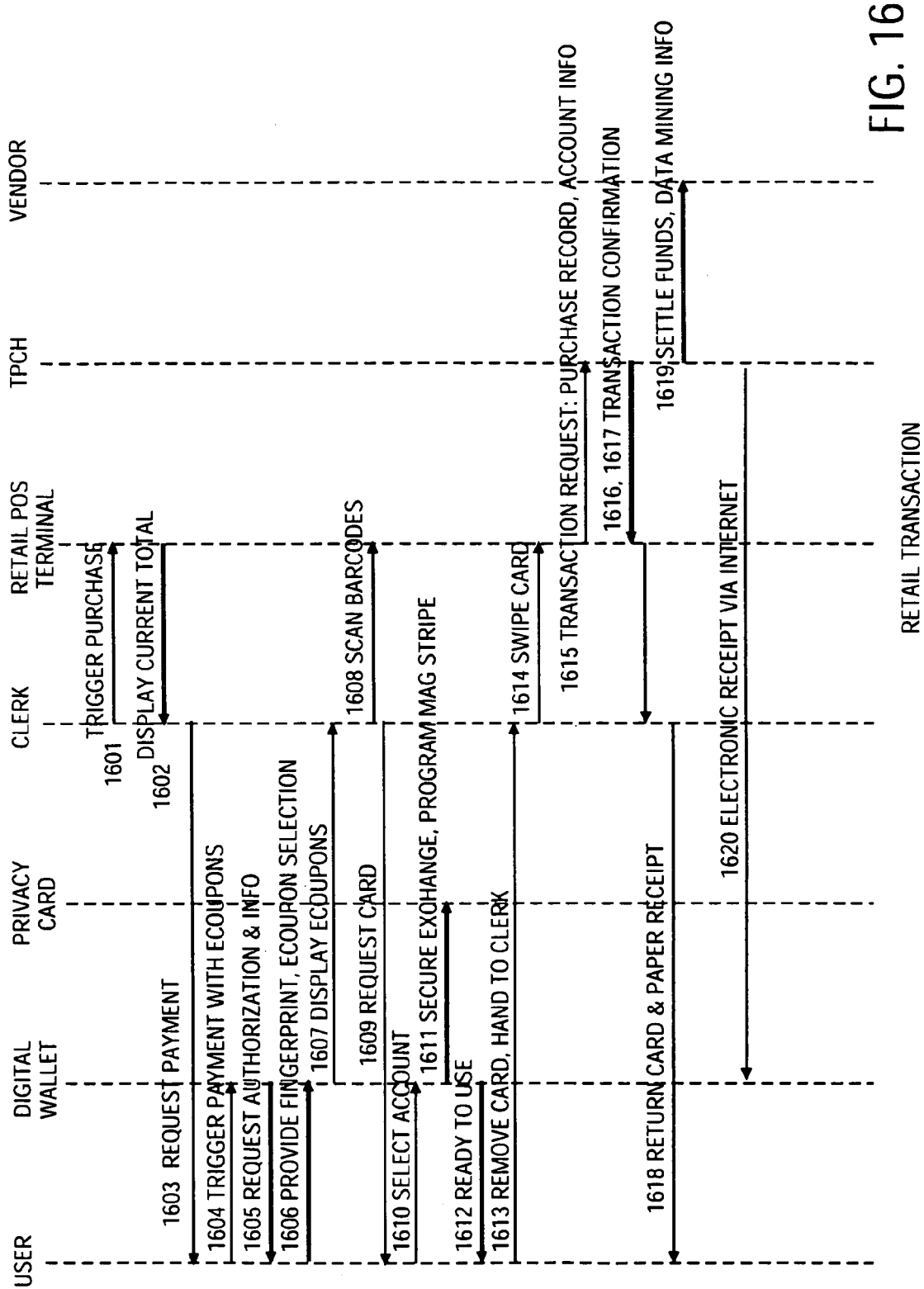
FIG. 16 illustrates one embodiment of a process for performing a retail transaction.

One embodiment of a transaction performed in the retail environment will be described with respect to FIG. 16. At step 1601 a clerk triggers the purchase action, after having passed the items to be purchased through a checkout procedure, normally by scanning barcodes on the packaging. At step 1602 the retail POS terminal displays the current transaction total, and asks the clerk to continue processing the transaction. At step 1603 the clerk requests payment from the user. At step 1604, the user activates the transaction device, requesting a payment transaction using any eCoupons that might have been collected by the transaction device prior to or during shopping. The transaction device requests the user to authenticate himself, for example, by fingerprint recognition, step 1605. The user presses on the finger print recognition pad to continue, step 1606. After verifying the user, the transaction device displays the collection of eCoupons that the user requested on its display screen, step 1607.

The user hands the transaction device to the clerk, who successively scans the eCoupons barcodes into the legacy POS terminal in a manner similar to how paper coupons are scanned into the terminal. After each barcode is scanned, the clerk presses a "next" button, which indicates to the transaction device that the eCoupon was successfully entered. The transaction device then displays a bar code of a next eCoupon, and this process continues until all eCoupons have been entered for the transaction, step 1608.

At step 1609, payment is initiated. At step 1610 the user selects an account to use for payment by interacting with the transaction device, either by tapping on a text menu or on icons that represents the account to use. At step 1611, the magnetic stripe generator of the transaction device is programmed with the appropriate account number information.

At step 1612, the transaction device indicates to the user that the transaction device is now ready to be processed in the transaction. The transaction device is coupled to the magnetic stripe reader of the legacy POS terminal, just as it is currently done with typical credit or debit cards today to provide the necessary information.

The retail POS terminal establishes a secure connection with the TPCH, and requests that the transaction be carried out, step 1615. It communicates the transaction record of items to be purchased, total, etc. and the requested account information. Assuming that the transaction is successful, the TPCH returns a confirmation message to the retail POS terminal, step 1616, which in turn may display an appropriate message to the clerk, step 1617. The clerk may then return the transaction device and perhaps a paper receipt of the transaction to the user, step 1618.

The TPCH settles funds, transferring the appropriate amount into the vendor's account. It may also return any data mining information to the vendor's back-end system, for the use of the vendor in its own business management, step 1619.

The TPCH may also send an electronic receipt, step 1620, to the transaction device via an alternate connection such as the Internet. The transaction device can store this information or communicate it to the personal POS terminal back at the user's home if they are two separate devices. This activity may not necessarily occur while the user is still in the store; the electronic receipt may arrive some time later, depending on the ability of the transaction device to establish some kind of network connection with the TPCH, such as through a web browser, direct dialup, etc.

Figure 17:
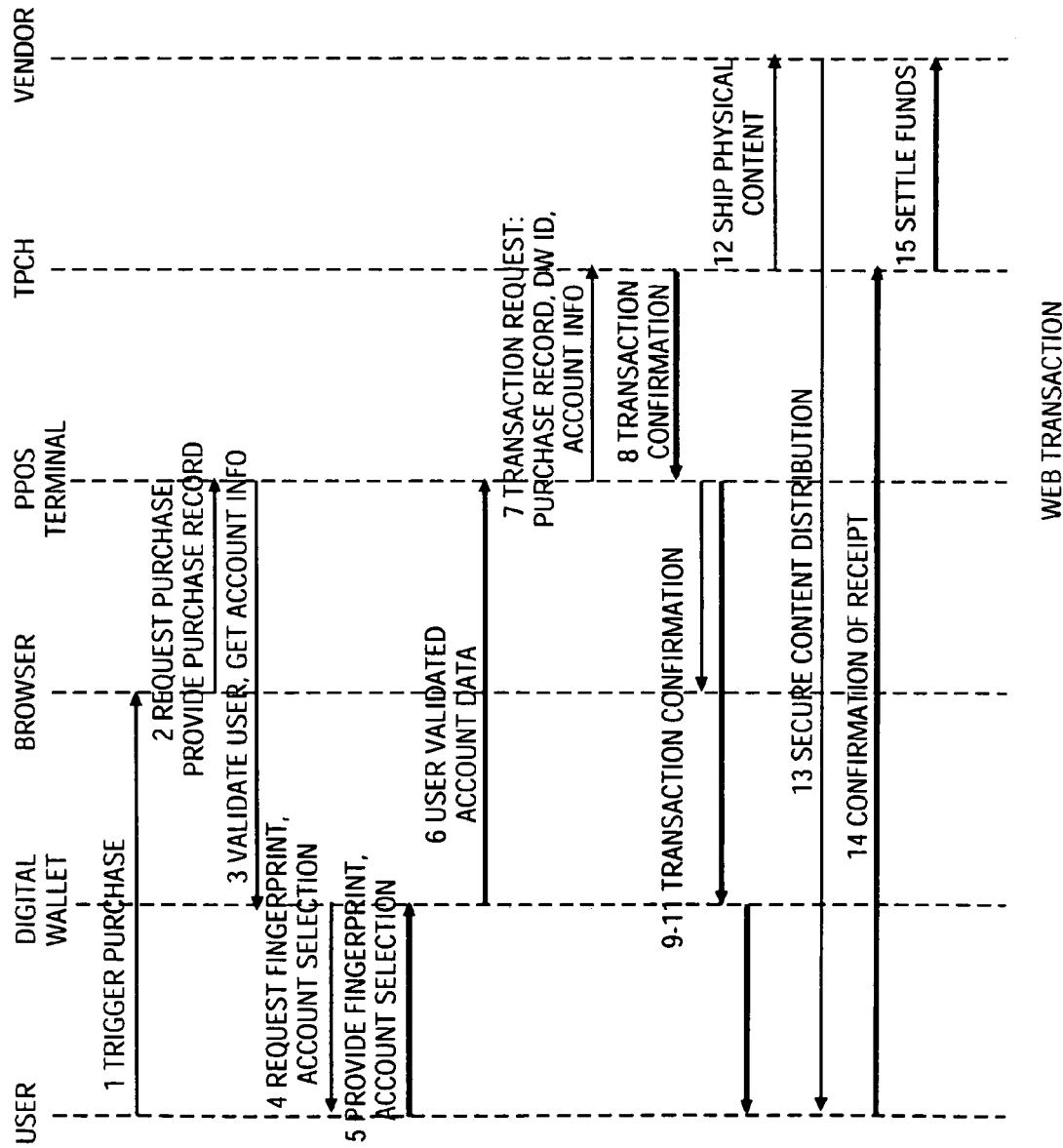
FIG. 17 illustrates one embodiment of the process of performing a web-based transaction.

An example of a web-based transaction performed in accordance with the teachings of the present invention is discussed with reference to FIG. 17. The following sequence describes steps involved in a typical web-based transaction using a transaction device such as a privacy card and/or digital wallet and a personal POS terminal.

In the present example, the user may be at home with a PC, cable, satellite or digital television device, a web browser, and a personal POS terminal device as described herein. The user has selected items to be purchased and is ready to trigger a purchase. The user may either navigate to a web page by using the facilities of the web browser, or by triggering a shopping activity using the transaction device.

For example, if the transaction device is used to trigger shopping activity, the user may tap on an on-screen icon being displayed by the transaction device, e.g., digital wallet; and the digital wallet transmits a signal to the PC or DTV, via the personal POS terminal, which then transmits the signal to the web browser. The transmitted signal causes the web browser to launch if it is not already running, and to navigate to the desired web page indicated by the icon.

The user triggers the purchase, usually by clicking on a "Buy!" or similar button in the web browser. In this embodiment, the browser has been "customized" via a plug-in that allows it to communicate with the personal POS terminal, which is either integrated directly into the host PC or DTV, or has been added as a peripheral device via a known interface.

In an alternative embodiment of the system, the personal POS terminal functionality of providing secure communication and transactions with the Transaction Privacy Clearing House (TPCH) can be integrated into the digital wallet directly. In this embodiment, a remaining functionality to be provided is the communications interface between the digital wallet and the host PC or DTV. This can be implemented via a wired or wireless connection, for example, USB telephone, IEEE 1394, etc.

Once a transaction has been triggered, the browser communicates with the personal POS terminal, requesting it to initiate a transaction. The browser provides a transaction record, which includes all of the necessary data to support this transaction, including a list of items being purchased, unit cost and quantity, the vendor who will provide the items, etc.

When the personal POS terminal receives the transaction request, it communicates with the transaction device, asking the transaction device to validate the user, confirm that the user wants to make this transaction, and get the appropriate information for which account the user wants to use for payment.

The transaction device may request the user's attention, either via audio or video signals, or both. The transaction device screen, or alternately, a personal POS display, PC or DTV screen, displays the transaction amount, and requests the user to select which account to use for payment. When the user has selected an account, the transaction device asks the user to confirm the entire transaction and that the user is authorized, for example, by entering a PIN or providing a fingerprint recognition sample.

The transaction device receives confirmation of the transaction and validates that the user is authorized. When information on the user's side of the transaction has been set up to perform a transaction, the personal POS terminal opens a secure communications session to the TPCH, requesting a transaction. The personal POS terminal provides the transaction record that it received from the web browser and the unique ID of the transaction device. The TPCH uses the unique ID of the transaction device to process the transaction.

After validating that the transaction device is in good standing and that the selected account has sufficient funds for the transaction, the TPCH issues a transaction confirmation back to the personal POS terminal. The personal POS terminal reflects the transaction confirmation back to the web browser and the transaction device. The transaction device may display a transaction confirmation to the user and may additionally record the transaction in its local storage. The personal POS terminal may also record the transaction in its local storage. In addition, in alternate embodiments, the personal POS terminal may enter the transaction directly into the user's personal finance program (e.g., Quicken) which may be executing on the user's PC or on the personal POS terminal.

Secure distribution of physical (or electronic) content to the user is performed once the transaction is authorized. Subsequently, the TPCH receives confirmation that the content was successfully shipped to the user and the user has acknowledged receipt of the content. Once the confirmation is received, the TPCH processes the settlement of funds.

The settlement of funds involves the transfer of the appropriate financial credit into the vendor's account. For the purposes of this example, it is assumed that the account is managed completely by the TPCH, and thus the funds transfer is handled completely inside of the TPCH. The vendor is not given any user identity information regarding the transaction; rather, the user is represented only by the transaction device identification information.

In an alternative embodiment, the TPCH may issue a funds settlement request to a third party financial institution on behalf of the user, causing the necessary funds to be transferred to the vendor from the user's account. In yet another alternative embodiment, the TPCH may act as a proxy for the user, whereby the TPCH takes the funds from the user's account as managed by a third party financial institution, and then issues a funds transfer from the TPCH account to the vendor's account. This embodiment further preserves the user's identity by not linking it with the funds transfer into the vendor's account.

It is possible to use the transaction device, e.g., privacy Card and/or digital wallet, for transactions that do not guarantee user privacy and identity protection. An example of this would be a web site that has its own proprietary eCommerce solution, which is not necessarily compliant with the policies of the digital wallet system.

A web browser plug-in can detect whether a web site is compliant with a transaction device as described herein. If it detects a non-compliant web site, then it displays a warning message to the user that the user's identity may be compromised and operates to perform the transaction while attempting to maintain the identity of the user as confidential.

In one embodiment, the transaction device may be configured to attempt to take a variety of steps to assist the user with preserving privacy and identity information. For example, the transaction device and web browser plug-in can attempt to determine what items are being purchased, for example by examining the current web page or the shopping cart in use. If the items are identified either by a name, a type (such as "book: sport: baseball"), or other such descriptive information, the browser plug-in can execute a web search to find a transaction device-compliant web site where this item can be purchased while maintaining the confidentiality of the identity of the user.

If an alternative purchase site can not be determined, the transaction device may then provide artificial information to the web site's purchase forms so that the user's identity is not revealed. Typically, the web browser has no way of knowing what is a valid name and what is not, and therefore may not object to such a string of characters not representative of the user's identity.

The transaction device may provide an account at the TPCH that is dynamically related to the particular web site and/or vendor. One means of achieving this is for the transaction device to be manufactured with several hundred unique transaction device ID values stored in its permanent memory. In this embodiment, the TPCH may maintain a copy of these values, so it knows that whenever a transaction arrives with one of these values, the TPCH knows which transaction device, and hence which user, the transaction it associated with.

Thus, when the transaction device determines that a transaction is to be performed with respect to a web site that is not transaction device-compliant, it searches its internal storage to find an alternate transaction device ID that has not yet been used, or one that has previously been used for this particular web site and/or vendor. The transaction device then uses this alternate ID as the account number that the web site vendor can charge for this purchase.

In this embodiment, vendors are prevented from sharing transaction history information, because there is no apparent common base of information by which to identify a user. Thus, for example, web site X might be carrying out transactions with transaction device ID=7, and web site Y may be carrying out transactions with a transaction device ID=9. Both of these sites may be dealing with the same user and same transaction device, but they don't know this. For this reason, the vendors are unable to successfully carry out any data mining operations that may jeopardize the user's identity or privacy.

Alternately the transaction device may provide the required information that might expose the user's identity, but the user would be enabled to allow or reject the transaction before it is carried out.

In one embodiment, a digital wallet can be used to enable/disable a privacy card device while it is coupled to the digital wallet. The privacy card may include a dynamically programmable magnetic stripe that can be enabled/disabled from the digital wallet, and programmed with an appropriate account number based on either the user's interaction with the digital wallet, or with the digital wallet automatically selecting the appropriate account info based on information received, such as wireless signals.

The transaction device may utilize software agent technologies to dynamically adapt to the user. The agent monitors the user's habits and activities with the transaction device, and might occasionally even pose a question to the user in order to help with this characterization process. Over time, the agent learns about the preferences of the user, and thus helps to either filter out undesirable information that might be sent to the transaction device, or to actively search out information that the user might want (such as eCoupons, etc.)

In one embodiment, the transaction device may perform "local" data mining activities as part of its software agent activities. The local data mining information may occasionally be sent back to the TPCH, where it can be added to data mining information that had been generated there. In addition, the TPCH might update the transaction device with data mining information gathered by the TPCH.

In one embodiment, the transaction device can adapt to new services and functionality, either automatically by the transaction device or manually by the user. For example, on a web site the user might click a button that causes new functionality to be downloaded to the transaction device for access at a future time. The transaction device may also have wireless data transfer so it can detect the presence of a new service based on wireless data received.

The transaction device may have the ability to present the user with a "most likely" menu of functionality that the user wants to use at a given moment, based on the ability of the transaction device to detect its context (where it is, what the user might be doing at the moment, etc.). In one embodiment, a transaction device can potentially download and store a large amount of services and functionality, but not all of those services might be usable at any given time. For example, when arriving at a new location, the transaction device might download and store some services and functionality, but not all of those services might be usable at a particular moment. For example, when arriving at a new airport, the transaction device might download a new service that provides instructions for how to buy a train ticket to certain destinations. The dynamic adaptation to new services also includes the possibility of adapting to new settlement policies/mechanisms. For example, if the transaction device finds itself in the presence of a service that is managed by an alternate system, it can download not only the service software, but also the necessary underlying "transaction system" software. This might include new security protocols, etc.

For example, once a user has carried out a typical transaction to purchase electronic content, or has used the transaction device to register as a user of digital content that is delivered periodically, the content provider knows the transaction device ID and the electronic content distribution servers. The provider sends the content to the servers, along with a request to have it delivered to the transaction device itself, or to a proxy content viewing device. A "proxy content viewing device" may be something like a (digital television receiver) DTV. In one embodiment, the user receives the content or a reference to the content on the transaction device, but views that content on the DTV. This may be used for content that requires a larger screen or alternative viewing technologies that might not be provided on the transaction device itself.

Figure 18:
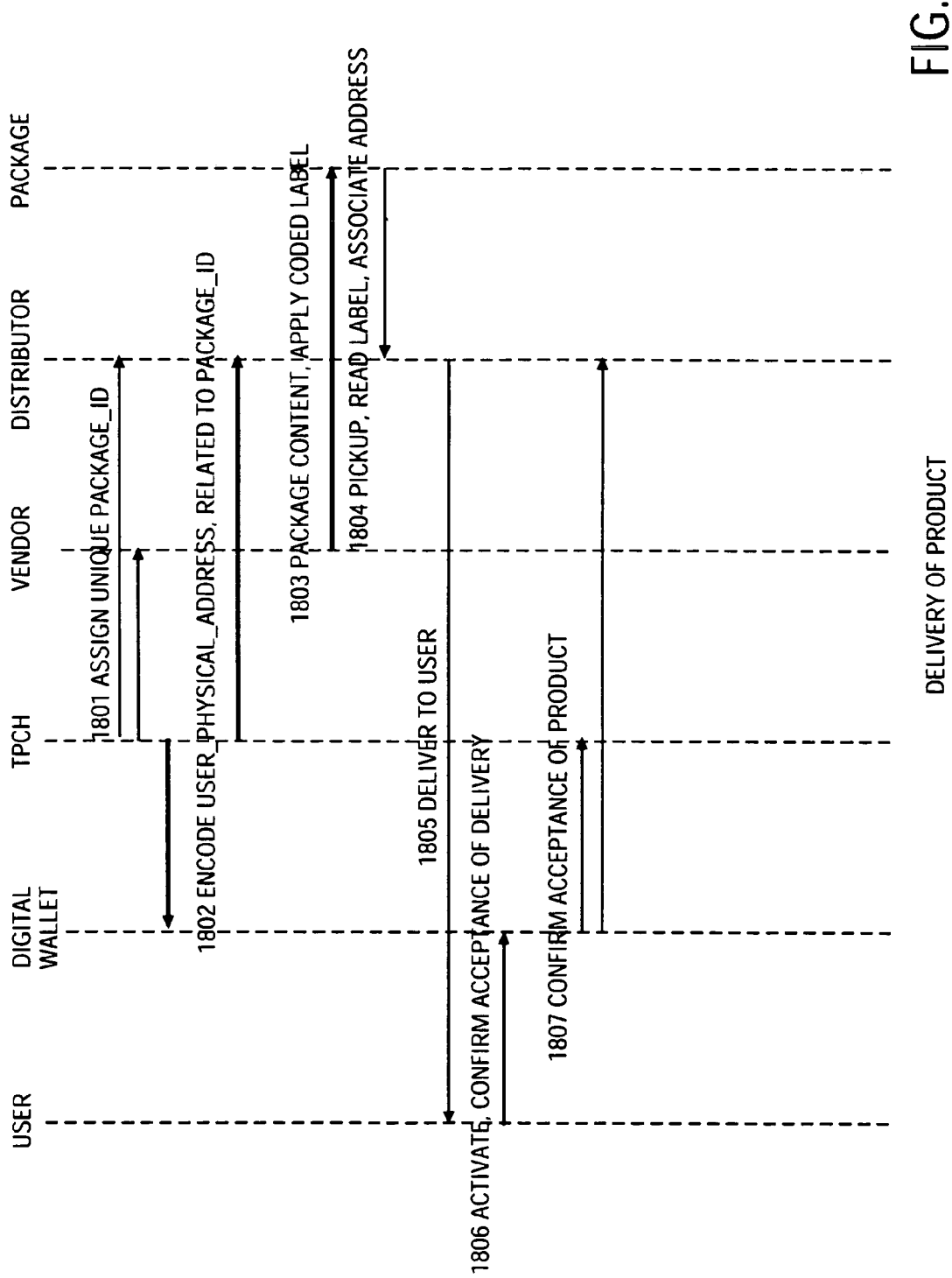
FIG. 18 illustrates one embodiment of a process for delivery of a product.

In one embodiment, the distribution of physical content is performed through a product distributor, such as FedEx or UPS, who would participate in the user privacy protection policies of the eCommerce system. Furthermore, the distributor and vendor may act as independent entities such that they do not share information that links user identities with the product purchase data. One embodiment of physical content distribution process is illustrated by FIG. 18.

At step 1801, as part of a transaction, the TPCH assigns a unique package ID for the physical content item to be distributed. The TPCH transmits this ID along with the purchase record, to the vendor and to the distributor. At step 1802, the TPCH looks into its secure databases to extract the user's physical address, encrypts this data, combines it into a data structure with the package ID, and securely transmits this data to the distributor.

The vendor puts the physical content into a package, and applies a coded label step 1803. In one embodiment the coded label would be an electronic label that can be read from/written to using wireless transmission technology. Alternative embodiments may include bar code data, or other mechanisms that are preferably machine-readable. In this embodiment, the user's name and address are not displayed on the label, are not encoded in the electronic label and not known by the vendor.

At step 1804, the distributor picks up the package and reads the electronic label using technology described above. Such technology could be added to existing devices commonly used by shippers such as UPS or FedEx, which already employ bar code scanning devices to streamline and optimize their shipping operations. The distributor has already received the necessary data from the TPCH which associates the user's physical address with the package ID, so the distributor's infrastructure processes the package as necessary, routing through delivery hubs, etc. The distributor takes the package to the user's physical address, step 1805.

Upon receiving the package, the user can inspect it for accuracy and quality, etc. Once satisfied that the product is correct, the user activates the transaction device, and activates the "confirm acceptance of package" menu option, step 1806. The transaction device carries out a secure message exchange with the distributor's handheld device (or other appropriate technologies) and with the TPCH, confirming that the product was successfully delivered and accepted, step 1807.

An alternate embodiment for delivery provides a measure of convenience for the user, by having items delivered to any specified location. In this embodiment, the distributor may be a participant in the privacy protection policies of the eCommerce system; furthermore the distributor and vendor may act as independent entities, such that they don't attempt to share business data in order to link user identity with product purchase data.

In another embodiment for physical product distribution, an "anonymous drop-off point", such as a convenience store or other ubiquitous location is used. In one embodiment, it involves the use of a "package distribution kiosk" that allows the user to retrieve the package from the kiosk in a secure fashion.

In addition to providing a package ID to the vendor, the TPCH also provides the user's transaction device ID. Instead of providing the user's physical address to the distributor, the TPCH provides the address of a product drop-off location such as a convenience store.

Instead of delivering the package to the user's home or another address that identifies the user, the distributor takes the package to the specified drop-off location. In one embodiment the drop-off location has one or more package distribution kiosks, which in one embodiment are machines that can securely hold and release packages. The kiosk may automatically read the electronic label of the package in order to determine which transaction device is the legitimate owner of the package.

At some later time, the user goes to the kiosk, and activates the transaction device that carries out a secure exchange with the kiosk to release the appropriate package(s). The user can choose to inspect the product there and put it back into the kiosk if there is any damage, incorrect product, etc. The kiosk issues the delivery confirmation or rejection message to the TPCH, and the TPCH in turn passes the appropriate information to the vendor and distributor.

In some situations, a product must be returned to the vendor at some time after it was accepted on initial delivery. This can happen under many circumstances: the package might be left at the door and therefore does not get "real time" acceptance or rejection by the user while the delivery person is present; the device might break while under warranty, etc.

Figure 19:
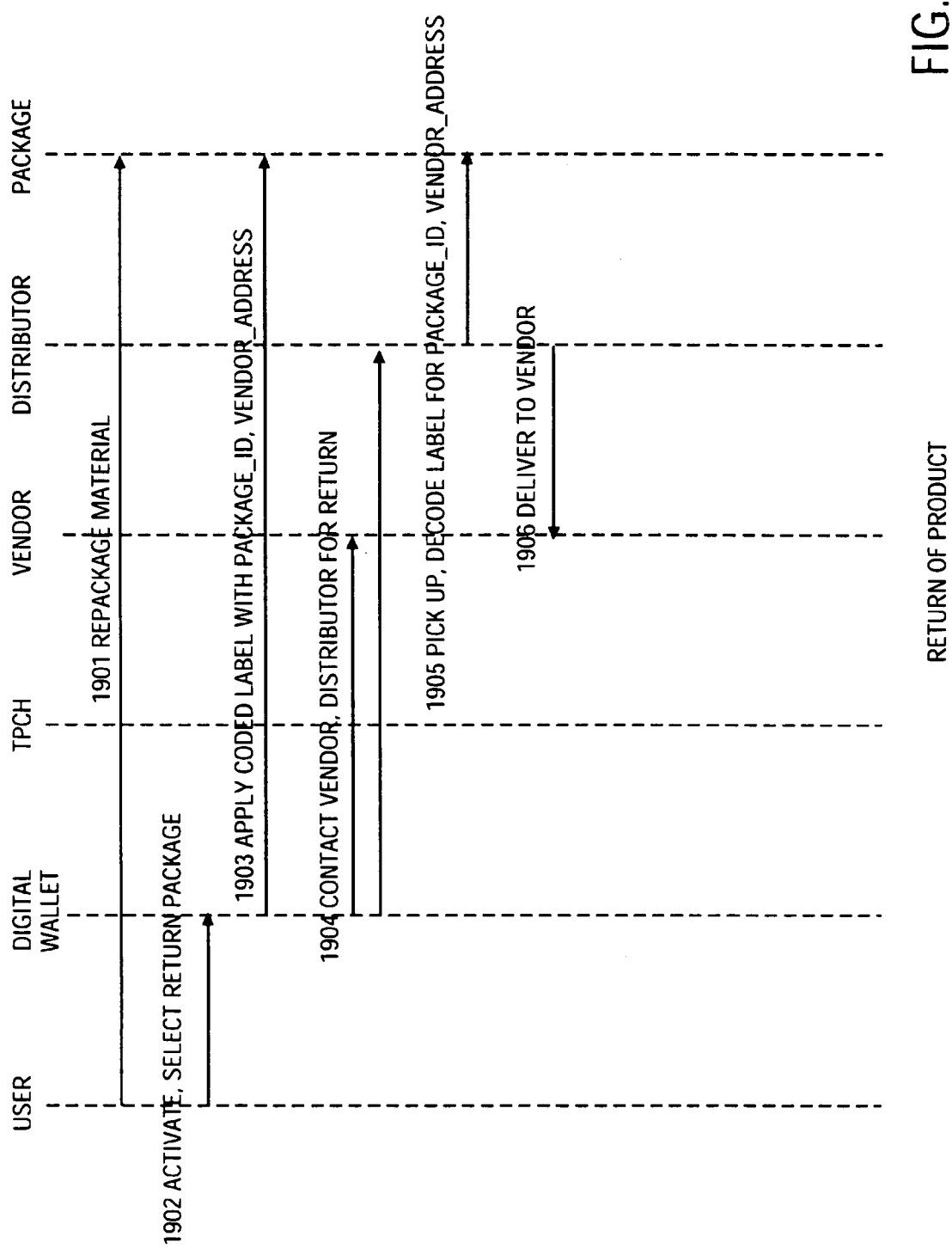
FIG. 19 illustrates one embodiment of a process for returning a product.

Once again, it is necessary to provide a solution that preserves the user's identity and privacy while at the same time allowing a very common activity to take place. One embodiment for returning a product is illustrated by FIG. 19.

At step 1901, the user repackages the item, activates the transaction device and selects the "Return Package" function step 1902. At step 1903, the transaction device encodes a label with the package ID and vendor address, which is also stored in the transaction device. This label is applied to the package. The transaction device contacts the vendor and distributor to initiate the package return process, step 1904.

The distributor picks up the package and reads the label, decoding the package ID and vendor address, step 1905. The distributor returns the package to the appropriate vendor. The vendor has the necessary information to manage product warranty, tracking ownership via the transaction device ID, etc, step 1906. Using this process, the user's privacy and identity information are not violated.

Another aspect of the present system is its ability to provide enhanced data mining and direct marketing for retailers while simultaneously providing user privacy and identity protection. Privacy is achieved by maintaining the user's identity information, such as name, address, etc. for limited access in a secure system such as the TPCH described herein.

When the user registers for and receives a transaction device, that device's globally unique ID value is associated with the user by the TPCH. Whenever the user carries out a transaction using the system, vendors receive only the transaction device ID in the transaction record. Thus, the transaction device acts as a digital alias for its user. When vendors need to contact the user who performed a transaction, they use the TPCH as an intermediary, requesting that it send the message to the transaction device with a given ID. Because the transaction device is an interactive device with communications capabilities, it can receive messages via the TPCH in a variety of ways, including wireless, Internet, a pager system, cellular, etc. It can then inform the user that a message is waiting. Depending upon the nature of the message, the user can view and respond to it directly on the digital wallet, or the user can view the message on an associated device such as a PC or DTV using the transaction device to gain access to the message.

A number of variations on data mining are contemplated. In one embodiment, the TPCH can compile an aggregate consumption profile of those users who use multiple transaction devices. In an alternate embodiment, one-to-one marketing is performed, which allows a vendor to communicate with a specific customer via the transaction device.

It is apparent that use of the transaction device enables a user to avoid unwanted solicitations. The TPCH may selectively provide consumption information. Alternately, a user may disassociate himself from their consumption profile by merely obtaining a new transaction device that would have a new device identification or by having a new ID associated with an existing device.

Figure 20:
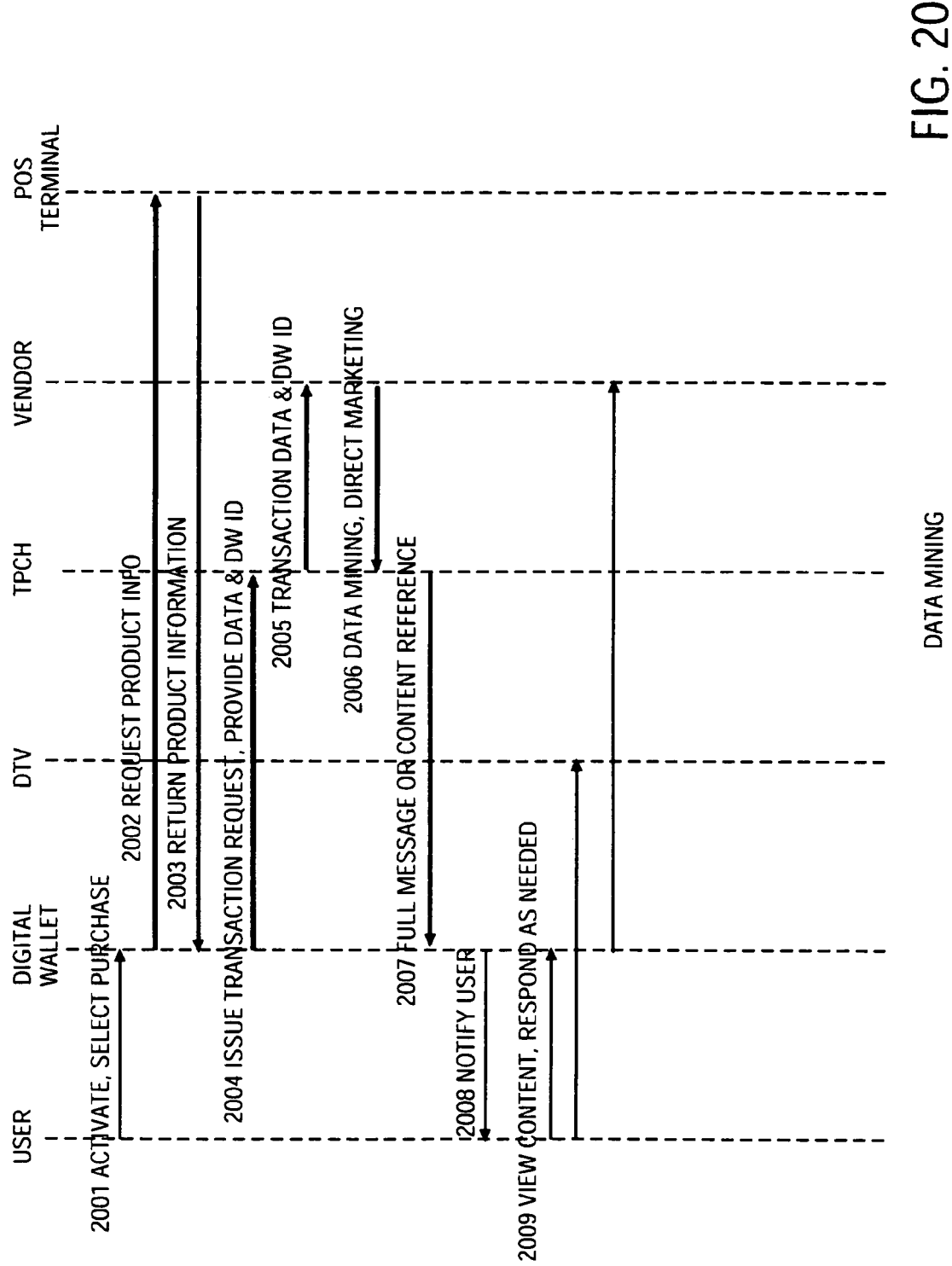
FIG. 20 illustrates one embodiment of a process for data mining and direct marketing.

An example of how data mining and direct marketing may be performed is illustrated by FIG. 20. At step 2001 the user activates the transaction device and requests a purchase action. The transaction device requests the necessary transaction information from the POS terminal (for example, a personal POS terminal or retail POS terminal), including information about the products being purchased, step 2002. The information may include data such as item categories (dairy:milk:low fat), and other information that is useful for data mining purposes. Such information can be enabled using technologies such as the XML (Extensible Markup Language) protocol, which allows two or more parties to agree on an interpretation of flexible data structure mechanisms.

At step 2003, the requested information is returned to the transaction device, where it is mined by the software agent technology resident in the transaction device. The results of the data mining may also be retained in the local storage of the transaction device. Alternatively, these results could be stored in a device coupled to the transaction device, such as a PC, another portable device such as a cell phone, etc. Such devices, assuming that they are always or typically in the proximity of the transaction device, would be able to offload some of the data storage requirements of the transaction device.

At step 2004, the transaction device carries out the necessary secure transaction communication with the TPCH, providing the transaction data and its device ID. At step 2005, as part of the transaction processing sequence, the TPCH delivers the necessary transaction information to the vendor. This includes basic information about the products being purchased and the ID of the transaction device being used for the transaction. Note that in this embodiment, it may not be necessary to provide an extensive amount of information about the products as is provided in step 2002, because presumably the vendor has this information in its own databases.

At step 2006, the vendor does its own data mining, associating the transaction device ID with the transaction and the details such as where the items were purchased (what store, what web site), when they were purchased, etc. At some time in the future, the vendor may want to follow up on this data mining activity by sending direct marketing material to the user. In one embodiment, the vendor can send materials by providing the materials and the transaction device ID to the TPCH, requesting a direct marketing distribution service.

At step 2007, depending on the nature of the content, the TPCH sends the full content or a reference to that content, such as a web URL, to the transaction device. At step 2008, the transaction device notifies the user that an incoming message has been received. This notification could be immediate, or delayed until the user has activated the transaction device for some reason. The means of notification could include audio and video signals.

At step 2009, at some time in the future, the user may choose to view all pending messages. Alternatively, the transaction device might automatically detect that it is in proximity of a suitable viewing device such as the DTV, for example, and will remind the user that a message is waiting that is best viewed on the DTV. The user selects which items to review, and if appropriate, responds to the vendor.

A method and apparatus for a real-time, event-driven, agent-enabled coupon and discount (REACD) management system involving multiple merchants are described in detail below. In one embodiment, for purchase transactions involving more than one merchant, the REACD management system may determine values of coupons and discounts for a purchase item, and regulates the currency value that each merchant involved may be allocated out of the purchase price. Additionally, the management system may include an agent-based sub-system which uses expiration dates associated with the values of the purchase, coupon, or discount.

Figure 21:
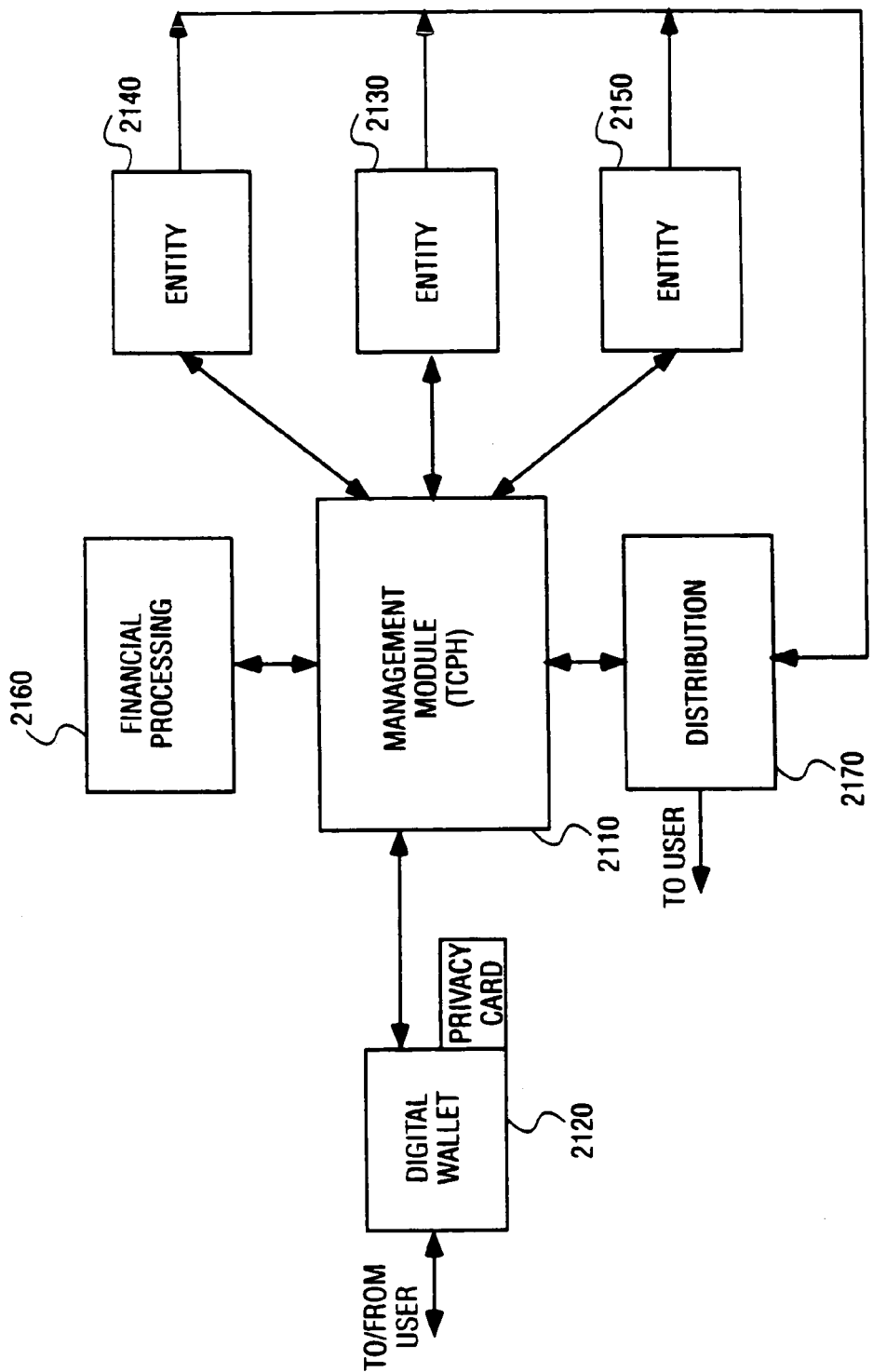
FIG. 21 is a block diagram for one embodiment of a system for facilitating real time transactions between a user and multiple entities.

FIG. 21 is a block diagram for one embodiment of a REACD system 2100 for facilitating real time transactions between a user and multiple entities. Referring to FIG. 21, system 2100 includes a management module 2110 for performing real-time, event-driven, agent-enabled coupon and discount management operations. Multiple entities are coupled to the management module 2110. Entities 2130-2150 may be, for example, merchant or vendor sites or servers. In addition, management module 2110 is further coupled to a financial processing entity 2160 and a distribution entity 2170. A user may interact with the management module 2110 via digital wallet and privacy card 2120.

In one embodiment, the financial processing entity 2160 provides financial information related to the user 2120 and financial information related to each entity 2130, 2140, and 2150. In one embodiment, the distribution entity 2170 provides distribution information, such as shipping prices, discounts, and terms, related to each merchant or vendor 2130, 2140, and 2150. Alternatively, the distribution entity 2170 may provide distribution information related to independent distribution agents, for example shipping companies not associated with the merchants 2130, 2140, 2150.

In one embodiment, the user initiates a transaction and contacts a primary merchant 2130 to handle the transaction. If the selected merchant 2130 cannot complete the transaction directly, it sends a request to management module 2110 to facilitate the transaction.

In one embodiment, management module 2110 receives the request from merchant 2130 and identifies ancillary merchants 2140, 2150 that may have the ability to complete the transaction. Management module 2110 facilitates the exchange of information among merchants 2130 through 2150. The management module 2110 handles all relationships and any subsequent changes related to the performance of the transaction. In one embodiment, management module 2110 performs a repetitive process until it finds a merchant able to complete the transaction.

In one embodiment, management module 2110 enables a secure link between the primary merchant 2130 and ancillary merchants 2140 and 2150 in order to facilitate the exchange of information in real time without intervention from the user. Alternatively, the link between primary merchant 2130 and ancillary merchants 2140, 2150 may be provided through management module 2110.

In one embodiment, management module 2110 facilitates the exchange of user discount information among merchants, for example purchase, coupon, and/or discount information relating to the transaction. Alternatively, management module 2110 may also facilitate the exchange of user financial information to be used in completing the transaction. In one embodiment, the user financial information includes financial accounts and services belonging to the user, for example credit card accounts, bank accounts, investment accounts, utility accounts, available mortgage information, and predetermined forms of identification of the user.

In one embodiment, management module 2110 further enables a merchant-to-merchant exchange of merchant financial information, for example a bank account to be used in performing the transaction, line of credit accounts, and financial verification information, in order to facilitate the performance of the transaction.

In one embodiment, management module 2110 further enables a merchant-to-merchant exchange of merchant-specific information, for example loyalty program agreements among merchants 2130 through 2150, merchant relationship discounts, or other incentive information that may not be available to the user.

In one embodiment, management module 2110 further enables an exchange of distribution information, such as shipping discounts and terms available from each ancillary merchant 2140, 2150, as well as distribution information available from independent distribution agents related to the merchants.

In one embodiment, management module 2110 further handles the negotiation of the transaction elements, for example a purchase price of an item sought by the user, user discounts and coupons, merchant relationship discounts, and shipping discounts and terms. In one embodiment, expiration dates associated with the value and amount of the user and merchant discounts may be implemented and negotiated by the management module 2110. In one embodiment, management module 2110 processes portions of the transaction to calculate the best purchase price for the user and then selects one merchant to complete the transaction.

After selection of the merchant, management module 2110 completes the transaction on behalf of the user. In one embodiment, the user receives an electronic receipt of the completed transaction, showing information relating to the activities performed to complete the transaction. Considering the example of a purchase agreement, the purchase is completed based on the exchange of information and the selection of the merchant. The user receives an electronic receipt of the purchase and receives the product using a shipping method selected. Each merchant 2130, 2140, 2150 involved in the transaction receives a best incentive program, for example its corresponding merchant discount, rebate, or other form of compensation apportioned from the value of the transaction by the management module 2110.

Figure 22:
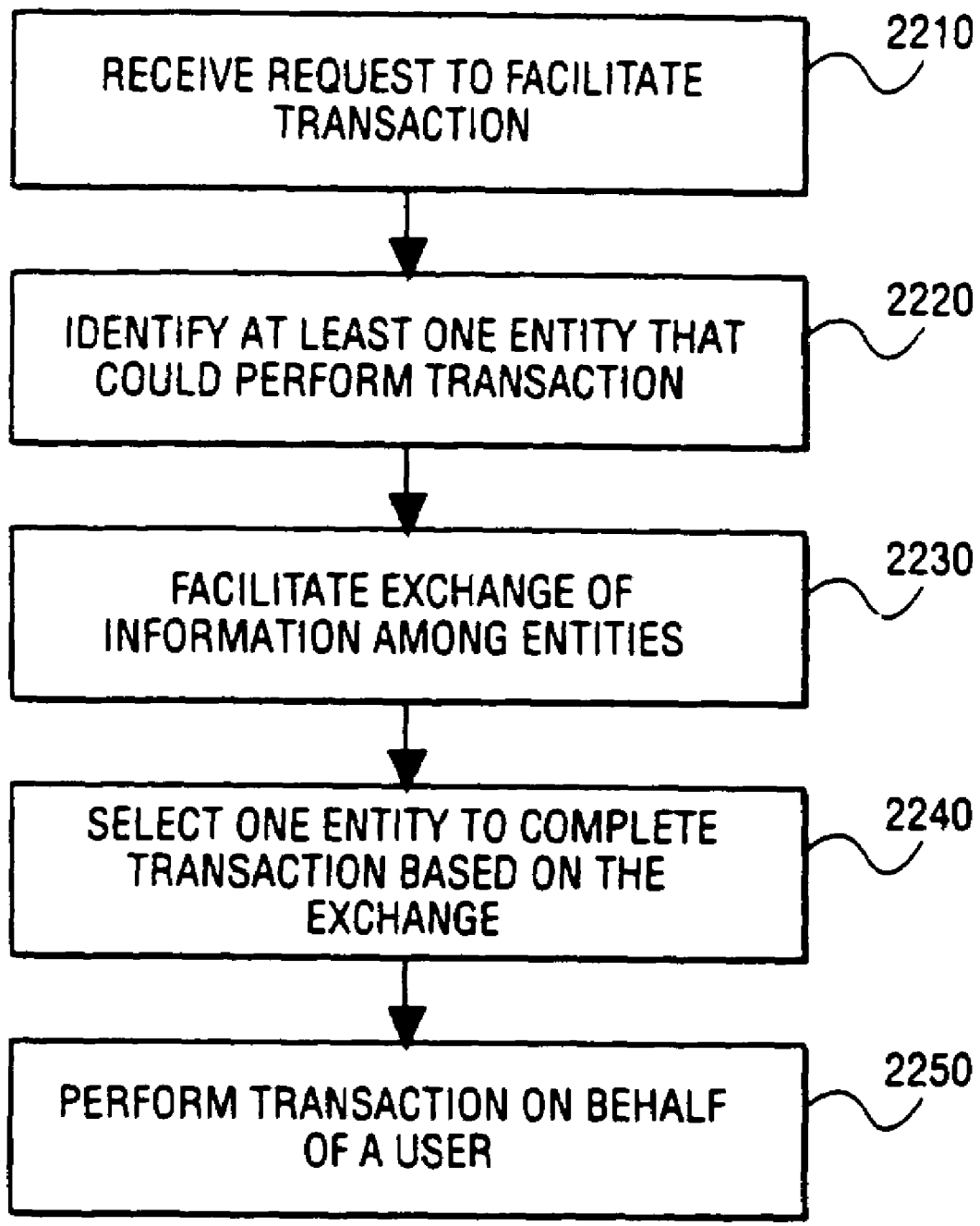
FIG. 22 is a flow diagram for one embodiment of facilitating real time transactions between a user and multiple entities.

FIG. 22 is a flow diagram of one embodiment of a method for facilitating real time transactions between a user and multiple entities. According to FIG. 22, in one embodiment, at processing block 2210, a request to facilitate a transaction is received.

In one embodiment, a user deciding to perform a transaction contacts a specific primary merchant to handle the research and performance activities. In one embodiment, the transaction encompasses a purchase of an item and the primary merchant is selected to handle price research and purchasing of the item. The merchant sends the request to facilitate the transaction to the management module. In one embodiment, the management module resides in a location on separate from the primary merchant. Alternatively, the management module may reside within the primary merchant.

At processing block 2220, at least one entity that could perform the transaction, for example a merchant or vendor, is identified. In one embodiment, the management module identifies the one or more ancillary merchants that have the ability to perform the transaction. Considering the purchase of a product, the management module identifies the merchants that offer and stock the product, for example manufacturers, wholesalers, or retailers.

At processing block 2230, an exchange of information among the identified entities, for example merchants or vendors, is facilitated. In one embodiment, the management module facilitates the exchange of information among merchants and handles all relationships and any subsequent changes in the brokering process related to the performance of the transaction. A method for exchanging information among merchants will be described in further detail below.

At processing block 2240, one entity is selected to complete the transaction based on results of the exchange of information among identified entities. In one embodiment, the management module selects the entity, for example the merchant or vendor, and recommends completion of the transaction. In one embodiment, for example, the management module selects one retailer, which has the product in stock and ready to be delivered, based on the information exchanged.

Finally, at processing block 2250, the transaction is performed on behalf of the user based on the selection of the merchant or vendor. In one embodiment, the user receives an electronic receipt of the completed transaction, showing information relating to the activities performed to complete the transaction. Considering the example of a purchase agreement, the purchase is completed based on the exchange of information and the selection of the merchant. The user receives an electronic receipt of the purchase and receives the product using a shipping method selected. At the same time, the selected merchant receives any discount or rebate that it is entitled to receive from the completion of the purchase.

Figure 23:
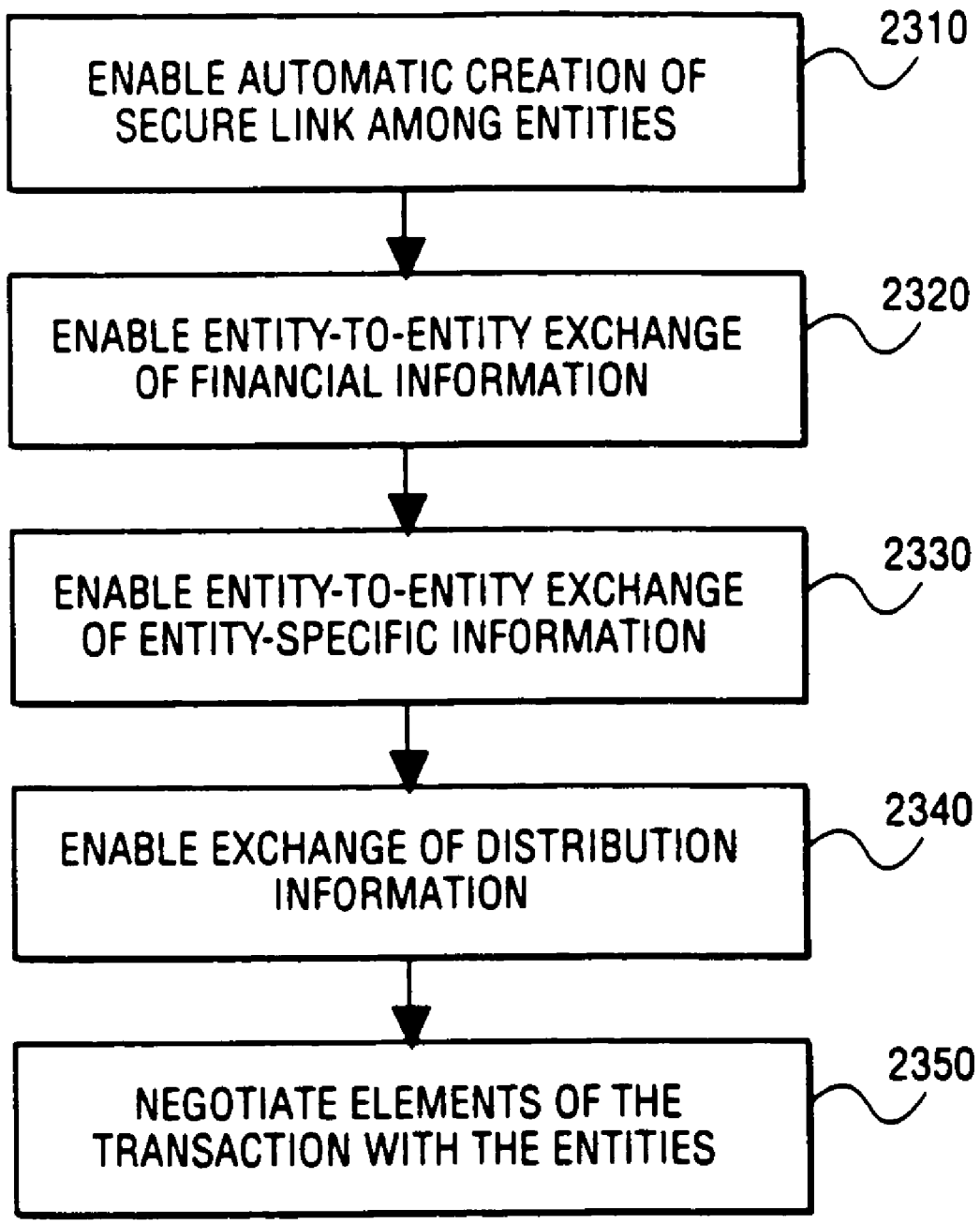
FIG. 23 is a flow diagram for one embodiment of exchanging information among entities sought to perform the transactions.

FIG. 23 is a flow diagram of one embodiment of a method for exchanging information among entities sought to perform the transactions, shown as processing block 2230 in FIG. 22. As illustrated in FIG. 23, at processing block 2310, an automatic creation of a secure link among identified entities is enabled. In one embodiment, the management module enables the secure link between the primary merchant and the identified ancillary merchants in order to facilitate the exchange of information in real time without intervention from the user requesting the transaction or the contacted primary merchant.

In one embodiment, the management module facilitates the exchange of user discount information among merchants, for example purchase, coupon, and/or discount information relating to the transaction. Alternatively, the management module may also facilitate the exchange of user financial information to be used in completing the transaction. In one embodiment, the user financial information includes financial accounts and services belonging to the user, for example credit card accounts, bank accounts, investment accounts, utility accounts, available mortgage information, and predetermined forms of identification of the user.

At processing block 2320, an entity-to-entity exchange of financial information is enabled. In one embodiment, the management module enables the merchant-to-merchant exchange of merchant financial information, for example a bank account to be used to perform the transaction, line of credit accounts, and financial verification information, which facilitate the performance of the transaction.

At processing block 2330, an entity-to-entity exchange of entity-specific information is enabled. In one embodiment, the management module enables the merchant-to-merchant exchange of merchant-specific information, for example loyalty program agreements among merchants, merchant relationship discounts, or other incentive information that may not be available to the user.

At processing block 2340, an exchange of distribution information is enabled. In one embodiment, the management module further enables the exchange of distribution information, such as shipping discounts and terms available from each ancillary merchant, as well as distribution information available from distribution operators related to the merchants.

At processing block 2350, the elements of the transaction are negotiated with the merchants. In one embodiment, the management module handles the negotiation of the transaction elements, for example the purchase price of the item sought by the user, user discounts and coupons, merchant relationship discounts, and shipping discounts and terms. In one embodiment, expiration dates associated with the value and amount of the user and merchant discounts may be implemented and negotiated by the management module. In one embodiment, the management module processes portions of the transaction to calculate the best purchase price for the user and then selects one merchant to complete the transaction, as described above in connection with processing block 2240 of FIG. 22.

In one example, if a consumer decides to purchase a DVD player, the consumer selects a merchant, for example a retailer or manufacturer, to handle the research and purchase activities. In one embodiment, the consumer has several credit card accounts, such as a Visa, a Mastercard, or a Discover Card, several bank accounts, such as a checking and savings accounts, an investment account, a driver's license identification document, a mortgage account, and several utility accounts, such as electricity, water, gas, cable.

The selected merchant determines that the consumer wants to purchase a DVD player that the merchant does not currently carry and, through secure back office activities and applications identifies an ancillary merchant, which shares information regarding availability and price of the product. An REACD agent of the selected merchant handles all relationships and any subsequent changes in the brokering process related to purchase price negotiation, discounts and coupons with an REACD agent of the ancillary merchant on behalf of the consumer, such as the use of a relationship discount due to the relationship between the selected merchant and the ancillary merchant. The REACD model facilitates the exchange of information between agents.

The selected merchant with help from the management system completes the purchase based on information received from the REACD agent, and arranges for direct shipping of the item from the ancillary merchant to the address of the consumer. An electronic receipt is delivered to the consumer, with a highlighted note providing information about the brokering activity performed on behalf of the consumer and the value of the total discount obtained for the consumer.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

The invention has been described in conjunction with the preferred embodiment. It is evident that numerous alternatives, modifications, variations and uses will be apparent to those skilled in the art in light of the foregoing description.

What is claimed is:

1. A method for establishing a link between a server of a primary merchant and a server of an ancillary merchant and exchanging client discount information on that link, the method comprising:
   receiving a purchase request at a transaction privacy clearing house (TPCH) server from the server of the primary merchant, wherein the purchase request originated from a client of the primary merchant;
   selecting the ancillary merchant by the TPCH server that can fulfill the purchase request;
   establishing a link for an exchange of said client discount information automatically between the server of the primary merchant and a server of the ancillary merchant through the TPCH;
   said server of the primary merchant completes the purchase request with the client discount information; and
   said server of the primary merchant uses the established link and automatically exchanges client discount information with the server of the selected ancillary merchant through the TPCH without interaction of the client, wherein the selected ancillary merchant fulfills the purchase request.

2. The method according to claim 1, wherein said exchange of user discount information is performed in real time.

3. The method according to claim 1, wherein said link is a secure link.

4. The method according to claim 1, wherein said exchange of user discount information allows completion of a transaction.

5. The method according to claim 4, further comprising:
   performing said transaction by providing a best price to a user involved in said transaction.

6. The method according to claim 4, further comprising:
   performing said transaction by providing a best incentive program to the ancillary merchant involved in said transaction.

7. The method according to claim 4, further comprising:
   performing said transaction by the primary merchant based on said exchange of user discount information.

8. The method according to claim 4, further comprising:
   selecting the ancillary merchant based on said exchange of user discount information; and
   performing said transaction by the primary merchant with the ancillary merchant on behalf of the user.

9. The method of claim 1, wherein the user discount information is information relating to the purchase request comprising of at least one of purchase, coupon and discount information.

10. The method of claim 1, further comprising:
    establishing a link for an exchange of user financial information between the server of the primary merchant and the server of the ancillary merchant without interaction of the user.

11. The method of claim 10, wherein the user financial information comprises at least one of a credit card account, a bank account, an investment account, a utility account, available mortgage information and a user identification.

12. The method of claim 1, further comprising:
    establishing a link for an exchange of merchant financial information between the server of the primary merchant and the server of the ancillary merchant without interaction of the user.

13. The method of claim 12, wherein the merchant financial information comprises at least one of a bank account, a line of credit account, a financial verification information, a loyalty program agreement and a merchant relationship discount.

14. The method of claim 1, further comprising:
    negotiating, by the TPCH server, a transaction element.

15. The method of claim 14, wherein the transaction element comprises at least one of a purchase price, a discount, a coupon, a merchant relationship discount and a shipping discount.

16. A system for establishing a link between a server of a primary merchant and a server of an ancillary merchant and exchanging client discount information on that link, the system comprising:
    a transaction privacy clearing house (TPCH) server adapted to:
    receive a purchase request at from the server of the primary merchant, wherein the purchase request originated from a client of the primary merchant;
    select the ancillary merchant that can fulfill the purchase request; and
    establish a link for an exchange of said client discount information automatically between the server of the primary merchant and a server of the ancillary merchant through the TPCH;

Server of the primary merchant adapted to:
complete the purchase request with the client discount information; and
use the established link and automatically exchanges client discount information with the server of the selected ancillary merchant through the TPCH without interaction of the client, wherein the selected ancillary merchant fulfills the purchase request.

17. The system according to claim 16, wherein said exchange of user discount information is performed in real time.

18. The system according to claim 16, wherein said link is a secure link.

19. The system according to claim 16, wherein said exchange of user discount information allows completion of a transaction.

20. The system according to claim 19, wherein said management module further performs said transaction by providing a best price to a user involved in said transaction.

21. The system according to claim 19, wherein said management module further performs said transaction by providing a best incentive program to the ancillary merchant involved in said transaction.

22. The system according to claim 19, wherein said management module further:
performs said transaction by the primary merchant based on said exchange of user discount information.

23. The system according to claim 16, wherein said management module further to:
select the ancillary merchant based on said exchange of user discount information; and
perform said transaction by the primary merchant with the ancillary merchant on behalf of the user.

24. The system of claim 16, wherein the user discount information is information relating to the purchase request comprising of at least one of purchase, coupon and discount information.

25. The system of claim 16, wherein said management module further establishes a link for an exchange of user financial information between the server of the primary merchant and the server of the ancillary merchant without interaction of the user.

26. The system of claim 25, wherein the user financial information comprises at least one of a credit card account, a bank account, an investment account, a utility account, available mortgage information and a user identification.

27. The system of claim 16, wherein said management module further establishes a link for an exchange of merchant financial information between the server of the primary merchant and the server of the ancillary merchant without interaction of the user.

28. The system of claim 27, wherein the merchant financial information comprises at least one of a bank account, a line of credit account, a financial verification information, a loyalty program agreement and a merchant relationship discount.

29. The system of claim 16, wherein said management module further negotiates, by a TPCH server, a transaction element.

30. The system of claim 29, wherein the transaction element comprises at least one of a purchase price, a discount, a coupon, a merchant relationship discount and a shipping discount.

31. A computer readable storage medium containing executable instructions, which, when executed in a processing system, cause said system to perform the method of establishing a link between a server of a primary merchant and a server of an ancillary merchant and exchanging client discount information on that link, the method comprising:
receiving a purchase request at a transaction privacy clearing house (TPCH) server from the server of the primary merchant, wherein the purchase request originated from a client of the primary merchant;
selecting the ancillary merchant by the TPCH server that can fulfill the purchase request;
establishing a link for an exchange of said client discount information automatically between the server of the primary merchant and a server of the ancillary merchant through the TPCH;
said server of the primary merchant completes the purchase request with the client discount information; and
said server of the primary merchant uses the established link and automatically exchanges client discount information with the server of the selected ancillary merchant through the TPCH without interaction of the client,
wherein the selected ancillary merchant fulfills the purchase request.

32. The computer readable storage medium according to claim 31, wherein said exchange of user discount information is performed in real time.

33. The computer readable storage medium according to claim 31, wherein said link is a secure link.

34. The computer readable storage medium according to claim 31, wherein said exchange of user discount information allows completion of a transaction.

35. The computer readable storage medium according to claim 34, wherein said method further comprises:
performing said transaction by providing a best price to a user involved in said transaction.

36. The computer readable storage medium according to claim 34, wherein said method further comprises:
performing said transaction by providing a best incentive program to the ancillary merchant involved in said transaction.

37. The computer readable storage medium according to claim 34, wherein said method further comprises:
performing said transaction by the primary merchant based on said exchange of user discount information.

38. The computer readable storage medium according to claim 34, wherein said method further comprises:
selecting the ancillary merchant based on said exchange of user discount information; and
performing said transaction by the primary merchant with of the ancillary merchant on behalf of the user.

39. The system of claim 31, wherein the user discount information is information relating to the purchase request comprising of at least one of purchase, coupon and discount information.

40. The computer readable storage medium according to claim 31, further comprising:
establishing a link for an exchange of user financial information between the server of the primary merchant and the server of the ancillary merchant without interaction of the user.

41. The computer readable storage medium according to claim 40, wherein the user financial information comprises at least one of a credit card account, a bank account, an investment account, a utility account, available mortgage information and a user identification.

42. The computer readable storage medium according to claim 31, further comprising:

establishing a link for an exchange of merchant financial information between the server of the primary merchant and the server of the ancillary merchant without interaction of the user.

43. The computer readable storage medium according to claim 42, wherein the merchant financial information comprises at least one of a bank account, a line of credit account, a financial verification information, a loyalty program agreement and a merchant relationship discount.

44. The computer readable storage medium according to claim 31, further comprising:

negotiating, by the TPCH server, a transaction element.

45. The computer readable storage medium according to claim 44, wherein the transaction element comprises at least one of a purchase price, a discount, a coupon, a merchant relationship discount and a shipping discount.

* * * * *